(12) United States Patent
Ko et al.

(10) Patent No.: US 7,783,956 B2
(45) Date of Patent: Aug. 24, 2010

(54) DATA RECORDER

(75) Inventors: Gwon Hee Ko, Meridian, ID (US); John Massie, Boise, ID (US)

(73) Assignee: Cronera Systems Incorporated, Boise, ID (US)

( * ) Notice: Subject to any disclaimer, the term of this patent is extended or adjusted under 35 U.S.C. 154(b) by 1045 days.

(21) Appl. No.: 11/456,935

(22) Filed: Jul. 12, 2006

(65) Prior Publication Data

US 2008/0034259 A1 Feb. 7, 2008

(51) Int. Cl.
*G11C 29/00* (2006.01)
(52) U.S. Cl. ................... 714/763; 714/770; 714/785
(58) Field of Classification Search ............ 714/763, 714/770, 785, 774, 776, 45; 710/21; 711/162; 369/47.5
See application file for complete search history.

(56) References Cited

U.S. PATENT DOCUMENTS

| | | | |
|---|---|---|---|
| 5,581,464 A | 12/1996 | Woll et al. | |
| 5,682,517 A * | 10/1997 | D'Andrea et al. | 711/162 |
| 5,835,935 A | 11/1998 | Estakhri et al. | |
| 5,845,313 A | 12/1998 | Estakhri et al. | |
| 5,907,856 A | 5/1999 | Estakhri et al. | |
| 5,924,113 A | 7/1999 | Estakhri et al. | |
| 5,928,370 A | 7/1999 | Asnaashari | |
| 5,930,815 A | 7/1999 | Estakhri et al. | |
| 5,953,737 A | 9/1999 | Estakhri et al. | |
| 6,088,759 A | 7/2000 | Hasbun et al. | |
| 6,115,785 A | 9/2000 | Estakhri et al. | |
| 6,145,051 A | 11/2000 | Estakhri et al. | |
| 6,182,188 B1 | 1/2001 | Hasbun et al. | |
| 6,230,234 B1 | 5/2001 | Estakhri et al. | |
| 6,412,040 B2 | 6/2002 | Hasbun et al. | |
| 6,567,307 B1 | 5/2003 | Estakhri | |
| 6,574,588 B1 | 6/2003 | Shapiro et al. | |
| 6,606,672 B1 * | 8/2003 | Chien | 710/21 |
| 6,622,200 B1 | 9/2003 | Hasbun et al. | |
| 6,631,493 B2 * | 10/2003 | Ottesen et al. | 714/774 |
| 6,772,274 B1 | 8/2004 | Estakhri | |
| 6,839,864 B2 | 1/2005 | Mambakkam et al. | |
| 6,883,074 B2 | 4/2005 | Lee et al. | |
| 6,898,162 B2 * | 5/2005 | Su et al. | 369/47.5 |
| 6,912,618 B2 | 6/2005 | Estakhri et al. | |
| 6,915,449 B2 * | 7/2005 | Bantz et al. | 714/15 |
| 6,950,918 B1 | 9/2005 | Estakhri | |
| 6,957,295 B1 | 10/2005 | Estakhri | |
| 6,978,342 B1 | 12/2005 | Estakhri et al. | |
| 7,007,205 B1 * | 2/2006 | Yeager et al. | 714/45 |
| 2001/0042158 A1 | 11/2001 | Hasbun et al. | |
| 2003/0195737 A1 | 10/2003 | Shapiro et al. | |
| 2004/0044837 A1 | 3/2004 | Hasbun et al. | |
| 2004/0064647 A1 | 4/2004 | DeWhitt et al. | |
| 2005/0086419 A1 | 4/2005 | Neble et al. | |
| 2005/0144360 A1 | 6/2005 | Bennett et al. | |
| 2005/0144365 A1 | 6/2005 | Gorobets et al. | |

(Continued)

*Primary Examiner*—Fritz Alphonse
(74) *Attorney, Agent, or Firm*—Zarian Midgley & Johnson PLLC

(57) ABSTRACT

A data recorder includes a first memory element including read/write capability, a second memory element including non-volatile memory and a controller for realizing memory management functions. The controller responds to a predetermined triggering event by writing selected data from the first memory element to the second memory element. The selected data include data units that have been modified after a prior triggering event.

18 Claims, 18 Drawing Sheets

U.S. PATENT DOCUMENTS

| | | |
|---|---|---|
| 2005/0177603 A1 | 8/2005 | Shavit |
| 2005/0187897 A1 | 8/2005 | Pawar et al. |
| 2005/0223043 A1 | 10/2005 | Randal et al. |
| 2005/0246487 A1 | 11/2005 | Ergan et al. |
| 2006/0036802 A1 | 2/2006 | Drukin |
| 2006/0047920 A1 | 3/2006 | Moore et al. |
| 2006/0080521 A1 | 4/2006 | Barr et al. |
| 2006/0176726 A1 | 8/2006 | Bhattacharyya et al. |

* cited by examiner

DATA RECORDER

FIELD OF THE DISCLOSURE

This disclosure relates generally to data recording functions in computing systems, including distributed and networked systems, and more particularly to archival aspects of memory/data recording functionality, which disclosed aspects may include policy-based, and/or flexible, as well as robust, implementation options for archival and business continuity and disaster recovery capabilities within a broad, yet policy-based and tailorable, context, via real-time and/or user or administrator-selectable menu of modalities.

BACKGROUND

Computer systems have evolved significantly during the last century. Starting from relatively slow, electromechanical data manipulation processors employed primarily by large businesses, present-day computer systems include a broad gamut of markedly higher-speed computation devices ranging from massively parallel processing complexes to highly agile, miniaturizable, portable and interconnectable multiple-function computation engines enjoying far broader distribution and a dramatically richer ensemble of applications than in past. Examples of landmark development areas in the broader supportive genre include transistors; microprocessors; networks, such as the ARPANET and Internet; and video technologies, among others.

One consequence of the dramatic expansion of computer systems has been need for increased memory for storage of computer-related or user-accessible information or data. While ongoing development of larger capacity memories continues to provide improvements in the time required to access memory contents, despite impressive and frequent increases in memory size, substantial performance advantages and improved competitive postures also result from techniques that improve how memory capabilities are employed and accessed.

These kinds of advantages tend to promote scalability, or a capacity to increase or decrease system size, number and/or size of applications that can be simultaneously provided, increasing the number of users who can be serviced at any one time, speed of service and the like. In turn, increased scalability often yields substantial competitive advantage potential, at least in part related to significant improvements in user and system capabilities, for example via dramatic and often continuously modifiable/upgradeable capacities.

As a result of increases in available computing power and speed, coupled with numerous other improvements, there have been sharply and constantly increasing needs for data storage capacity. This is exacerbated at the enterprise level, for example each user may have a copy of a dataset that is already represented elsewhere in a networked or distributed computing system, for a variety of reasons, such as, for example, for business continuity and disaster recovery purposes and for obviating bottlenecking in attempting to access pooled data resources. It is estimated that 75% or more of the data storage used in the average enterprise stores redundant dataset copies. Further, inasmuch as the resultant multiple copies may each contain differently-modified data elements, where the modifications are not coordinated into a central or primary data storage device, issues relating to synchronization of memory contents may occur.

In particular, in nonvolatile memory technologies, i.e., those memory types capable of retaining data without requiring continuous electrical input power, access speeds and capacities have barely kept pace or have largely fallen behind advances in other areas of computing technology, such that data storage is increasingly difficult to manage and is becoming increasingly problematic and time-consuming to archive effectively, and especially to effectuate such in conformance with present-day needs, and also, very notably to achieve such in an accurate manner while providing both robust/enduring data integrity coupled with suitable accessibility. Many types of nonvolatile memory technologies have historically employed magnetically-polarizable media, such as magnetic tape systems, hard drives and floppy disc drives. These types of memories typically employ multiple electromagnetic heads for encoding/writing data via modulation of the polarization state of a portion of the magnetic material, or reading data by sensing the polarization state of that portion of the medium in proximity to the heads. In turn, this requires that the medium be physically translated relative to the heads, which is frequently accomplished via rotation of spindles coupled to the media in conjunction with contemporaneous positioning of the head, e.g., radially, or otherwise, vis-à-vis motion of the media. Consequently, such memory/storage technologies may or often incur latency due to delay involved in physical translation of the medium and/or heads in order to access locations corresponding to specific stored data items.

Mass storage via nonvolatile memory technologies has not achieved any large quantum improvements in roughly fifty years, during the evolution process of spindle-based technologies, including tape drives and other electromechanical approaches such as various disc technologies. Continued reliance on spindle-based nonvolatile data storage has also spawned a legacy of increasingly awkward memory access and management schemes. Further, the read-write capabilities and limitations associated with such approaches lead to practices including overwriting older versions of data, with a result that prior datasets can be, and often are, destroyed. This destruction may be through deliberate and intentional, or totally inadvertent actions. In turn, destruction of prior datasets may have legally and practical implications.

SUMMARY

For the reasons discussed above, there are needs for improved data recording devices and processes, capable of providing rapid restoration of prior system status and data, and of achieving archival functions of great integrity. Additionally, there are needs for rapidly-accessible shared data resources capable of servicing individual computation resources, networks and enterprise-level distributed computing resources. Also, there are needs in enterprise and distributed systems for high integrity data storage vehicles accessible with low latency and where the data resources act to reduce redundancy of data storage functions within such systems. In addition, there is a need for a policy-based data recording system combined with additional data security, such as, automated archiving, business continuity, and/or disaster recovery functionality.

The above-mentioned drawbacks associated with existing systems and processes for data storage and archiving are addressed by embodiments of the presently-described materials, which will be understood by reading and studying the following specification.

In one embodiment, a data recorder comprises a first memory element including read/write capability, a second memory element including non-volatile memory, and a controller for realizing memory management functions. The controller writes selected data from the first memory element to the second memory element in response to a predetermined triggering event. The selected data includes data that have been modified after a prior triggering event.

In another embodiment, a process is disclosed for recording a state of computer-readable information associated with a computing resource. The process comprises accessing a read/write memory having temporal data stored therein, determining when a triggering event has occurred, and flushing the read/write memory into a non-volatile memory when a triggering event has occurred.

In another embodiment, a data recorder comprises an input/output switch coupled to an interconnection through which the data recorder can communicate with one or more first computing resources and a port coupled to an external input/output interface through which the data recorder can communicate with one or more second computing resources. The data recorder further comprises a plurality of memory elements in communication with the input/output switch and the port, and a controller in communication with the input/output switch, the port, and the plurality of memory elements. The controller is configured to coordinate data flow via the input/output switch to exchange information between the data recorder and the one or more first computing resources. The controller is also configured to coordinate data flow through the external input/output interface via the port to exchange information between the data recorder and the one or more second computing resources.

These and other embodiments of the present disclosure will be discussed more fully in the detailed description. The features, functions, and advantages can be achieved independently in various embodiments of the claimed subject matter, or may be combined in yet other embodiments.

BRIEF DESCRIPTION OF THE DRAWINGS

The accompanying drawings, which are incorporated in and constitute a part of this specification, illustrate exemplary embodiments of the disclosed subject matter, and, taken together with the written description, serve to explain the principles of that subject matter. Like reference characters and designations in the various drawings indicate like elements.

DETAILED DESCRIPTION

Figure 1:
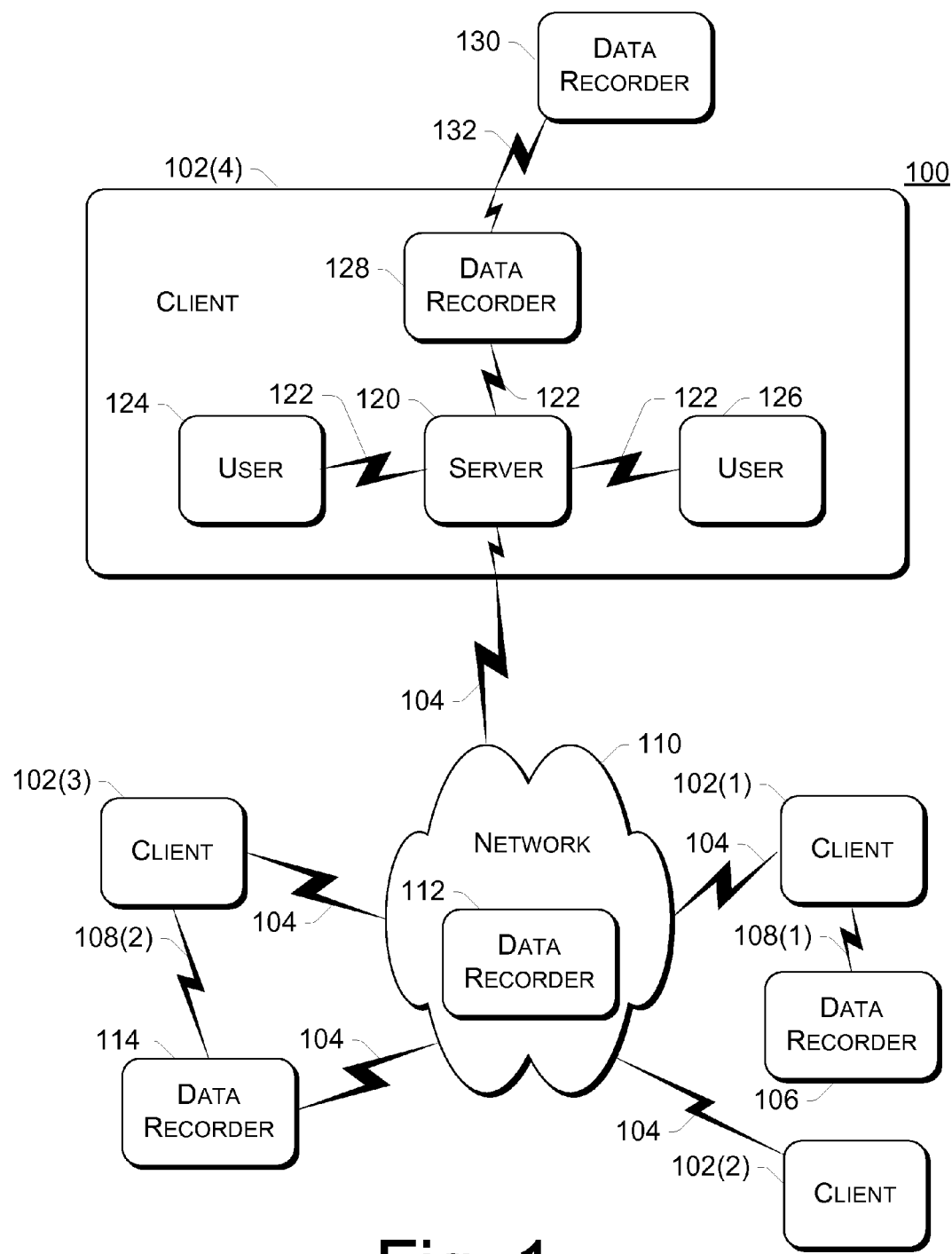
FIG. 1 illustrates an exemplary environment suitable for the concepts of the present disclosure.

In the following detailed description, reference is made to the accompanying drawings that form a part hereof, and in which are shown, by way of illustration, specific embodiments which may be practiced. These embodiments are described in sufficient detail to enable those skilled in the art to practice the embodiments, and it is to be understood that other embodiments may be utilized, and that logical, mechanical, electrical and other changes may be made without departing from the scope of the embodiments. Ranges of parameter values described herein are understood to include all subranges falling therewithin. The following detailed description is, therefore, not to be taken in a limiting sense. A technical effect of the systems and processes disclosed herein includes at least one of: archival storage, providing capability for rapid restoration of data or application files to a prior state, for example following corruption of such data structures, and can provide one or more of the functions associated with memory systems, including the functions often performed by hard drives, such as providing virtual memory, memory swap space, data for enabling extremely rapid booting with respect to power reset/turn on, instead of conventional boot functions, and interactive file access.

Introduction

The following section provides definitions, and addresses an exemplary environment in which data recording technology as disclosed herein finds utility. The discussion of the environment provides a framework within which various elements of the data recording technology can subsequently be developed.

As used herein, the term "data recorder" is defined to include a data storage device capable of storing multiple states of data and computer-readable information present in a computing system at respective given points in time, such that the state at any one of the given points in time may be reconstructed in real time. A data recorder may store the entire state of computing device or memory at a particular point in time, or may include a reference data group and subsequently generated, i.e., modified or created, data groups relative to the reference data group, such that a state of the computing device or memory at a particular point in time can be reconstructed using a combination of the subsequently generated data groups and the reference data group.

As used herein, the term "real time" is defined to include machine operations matching the human perception of time or those in which computer-based operations proceed at such a rate as a physical or external process—that is, real-time operations are those which do not incur delays outside the scope of the duration of other computer-based tasks.

As used herein, the term "data address" refers to a pointer to the address of the physical memory. In one embodiment, this refers to a unique NAND device ID coupled with a data unit address—often used to identify the physical location of data/transliterate between logical and physical addressing. In another embodiment, this refers to a unique recorder ID coupled with a unique NAND device ID coupled with a data unit address—often used to identify the physical location of data/transliterate between logical and physical addressing.

As used herein, the term "LBA table" refers to tabulated information descriptive of, and used in maintaining, relationships between LBA numbers and data addressing factors.

As used herein, the term "state" represents a snapshot of a memory array, such as a hard disk, at a point in time. A state includes information such that the LBA is presented to a host or connected computer, pointing to the data, such as data flushed at a recorded time or other data as modified in conformance with description herein.

As used herein, the term "free media pool" or "free pool" refers to a set of available memory addresses which may be used for memory write operations. The order of the entry can be determined by data aging algorithms, wear-leveling algorithms, data migration among other things.

As used herein, the term "data cloning" refers to duplication or increase in numerosity of similar or identical data units within a data recorder.

As used herein, the term "data replication" refers to duplication or increase in numerosity of similar or identical data units across data recorders.

As used herein, the term "data consolidation" refers to a reduction in numerosity of similar or identical data units.

As used herein, the term "data migration" refers to data cloning or replication followed by data consolidation.

As used herein, the term "data backup" refers to the copying of data for the purpose of having an additional copy of an original source. If the original data is damaged or lost, the backup copy can be accessed substantially in real time through a data recovery or restore process.

As used herein, the term "archive" refers to a snapshot of data or group of data and/or descriptors within a storage recorder, which corresponds to the state of the data or host at a particular point in time.

Environment

FIG. 1 illustrates an exemplary environment 100 suitable for implementation of the presently-disclosed concepts. The environment 100 includes N many clients 102, represented in FIG. 1 by four clients, e.g., clients 102(1), 102(2), 102(3) and 102(4), interconnections 104 forming a network 110, such as the Internet, a SAN, a LAN, a WAN etc., and a data recorder 106 coupled to the client 102(1) via a private interconnection 108(1). The interconnections 104/108 may be effectuated via conventional approaches, such as SONET, TCP/IP, USB, SCSI, ATA, SATA, SAS, SAN, Fiber Channel, InfiniBand, PCI, hypertransport or the like.

The data recorder 106 may be external to the client computer or host 102(1), or may be internal to the client computer 102(1). The environment 100 also includes a data recorder 112 forming a shared data recording capability, coupled to a plurality of computing devices or clients 102(N), encompassed and accessed via the network 110, and a data recorder 114 coupled to the client 102(3) via a private interconnection 108(2) and to the area network via one of the interconnections 104. The data recorder 112 may comprise a portion of a storage area network (SAN), represented in FIG. 1 as one or more additional data recorders 114 coupled to the data recorder 112 via interconnection(s) 104.

The client 102(4) is illustrated as forming a local area network, with a server 120 coupled via interconnections 122 to a first user 124, a second user 126 and a shared data recording resource 128.

The environment 100 illustrates several different ways in which data recorders 106, 112, 114, 128 and/or 130 may be configured. These configuration examples include capabilities for exchange of data via any of a variety of network configurations, such as a SAN, the Internet, a LAN, a WAN etc.

The network 110 may represent an enterprise level network, and may include a data recorder such as the example of the data recorder 106, i.e., coupled to a single computer or client 102(1), or shared data recorders such as data recorders 112, 114 and/or data recorders 128, 130, providing capabilities shared among many distributed computing resources 102(N) via various types of networks. Not all of clients 102(N) or data recorders 106, 112, 114, 128, 130 need be co-located at a single facility or location.

Clients 102(N) may exchange data with one or more of the data recorders 112, 114, 128, 130, and may share one or more databases which one or more of the clients 102(N) writes new data to and reads data from. The present disclosure describes shared data recording functions and archival aspects of data recording in the context of single computing resources such as the client 102(1) and/or distributed/shared computing networks 100 including many computing resources 102(N).

Data Recorder Embodiments

Figure 2:
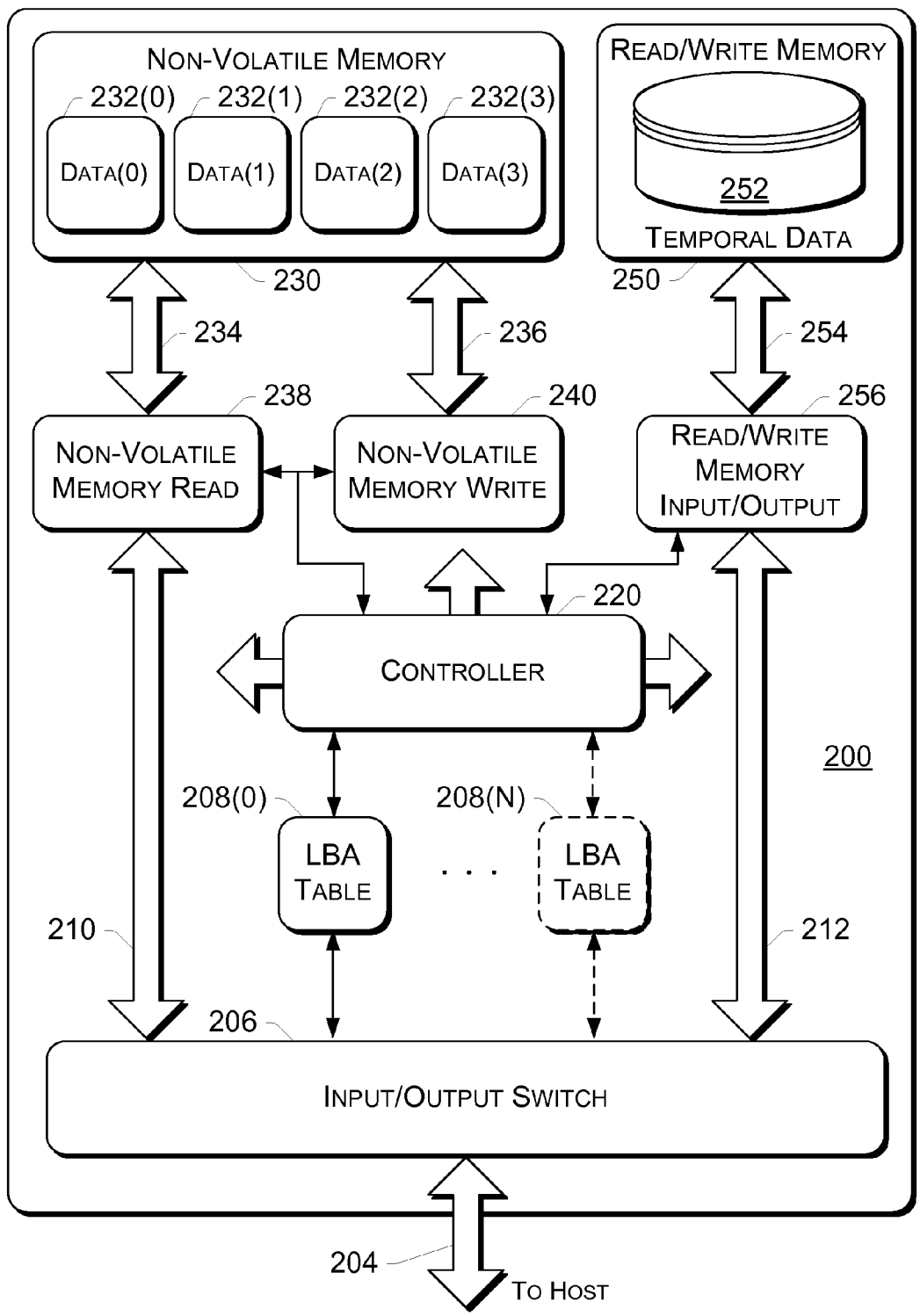
FIG. 2 is a simplified block diagram of an embodiment of a data recorder useful in the context of the environment of FIG. 1.

FIG. 2 is a simplified block diagram of a data recorder 200 (analogous to one or more of the data recorders 106, 112, 114, 128 and/or 130 of FIG. 1) useful in the context of the environment 100 of FIG. 1. The data recorder 200 includes an interconnection 204 (analogous to the interconnections 104/108 of FIG. 1) to a host or client computing resource (not shown in FIG. 2), and an input/output switch 206 coupled to the interconnection 204. At least one data storage device or area 208 includes organizational table(s) for stored data management, such as LBA (logical block address) tables etc. However, in contrast to prior art storage or memory management approaches, the presently-disclosed subject matter enables multiple LBA tables (208(0) through 208(N)) to be employed with respect to memory and thus realizes virtual boundaries there within.

As a result, physical boundaries (e.g., total memory unit size information) no longer impose constraints on usage and allocation or partitioning within a memory or data recorder. Creation of virtual boundaries also enables on-the-fly reapportionment of data-storage assets among multiple hosts or clients. An additional degree of flexibility results from ability to span one partition across multiple units, that is, to deploy one boundary within one physical unit and another within another physical unit to seamlessly avail to a user or host with a storage area having larger data capacity than afforded within a single physical unit.

In other words, virtual boundaries allow data recorders to be presented as an apparently single resource to a user as an aggregated unit, or may allow resources within one physical unit to be sliced or distributed among multiple hosts or to achieve a mixture or combination of both. The resulting partitions or other divisions may then be represented to one or more selected hosts in a number of manners. In one embodiment the presentation can be analogous to how a succession of discs or other directory-accessible resources are presented, for example in the context of the Windows® operating systems (available from Microsoft Corporation of Redmond Wash.). In another embodiment the presentation can be analogous to a removable disk or drive such as DVD, CD, USB, etc. In another embodiment native drivers present a storage recorder within an operating system. The data recorder 200 also includes a first bus 210 and a second bus 212 coupled to the input/output switch 206.

A controller 220 is coupled to elements of the data recorder 200, including the data storage device 208 containing organizational data. The controller 220 coordinates data flow via the input/output switch 206 and bus 204 to exchange information between a host such as one or more clients 102 (FIG. 1), and the data recorder 200, and may also coordinate data communications with one or more additional data recorders 200.

A non-volatile memory 230 includes a plurality of data storage elements represented in FIG. 2 as 232(0) having DATA(0) stored therein, 232(1) having DATA(1) stored therein, 232(2) having DATA(2) stored therein and 232(3) having DATA(3) stored therein, however, it will be appreciated that an arbitrary number of data storage elements 232(N) may be included in the non-volatile memory 230. The non-volatile memory 230 may include solid state memory devices (i.e., memory stored within a hardware device that contains no moving parts, e.g., FLASH memory, magnetoresistive random access memory (MRAM), etc.) and/or other types of non-volatile memory apparatus. A bus 234 and a bus 236 are coupled to the non-volatile memory 230. In another embodiment bus 234 and bus 236 can be one and the same bus. The bus 234 couples a non-volatile memory read module 238 to the non-volatile memory 230, and the bus 236 couples a non-volatile memory write module 240 to the non-volatile memory 230.

A read-write memory 250 is coupled via a bus 254 to a read/write memory input/output module 256 that in turn is coupled to the bus 212. In one embodiment, the non-volatile memory read module 238 and the non-volatile memory write module 240, and/or the read/write memory input/output module 256 may implement (i) one or more conventional error checking or error correction processes (e.g., error correcting code (ECC)), or a parity checking process or a combination of both; (ii) data security functions, such as encryption protocols relying on digital keys for provision of secure access; and/or (iii) data compression capabilities.

In the illustrated embodiment, the read-write memory 250 is shown as being separate from the non-volatile memory 230. In other embodiments, the read-write memory 250 can be a portion of the non-volatile memory 230.

In some embodiments, the read-write memory 250 includes one or more hard drives, as represented in FIG. 2 via illustration of optional hard drive 252. The high speed of rotation of disc drives facilitates both random and sequential access patterns. A hard disk or other memory asset is generally accessed over one of a number of bus types, including ATA (IDE, EIDE), serial ATA, SCSI, SAS, IEEE 1394, USB and Fiber Channel.

In some multi-user database-driven applications, speed of random hard disk I/O operations can be a significant performance-limiting factor, and, although hard and floppy disk I/O speeds have improved somewhat over the past twenty years, disk throughput has increased by a factor of roughly one hundred (e.g., from circa one megabyte per second in 1986 using 5.25" SCSI disks, to roughly one hundred megabytes per second, sustainable in 2005, via 3.5" SAS (Serial Attached SCSI) disks), in contradistinction, random access I/O latency of hard disc systems, which is related to rotational velocity, has improved by only a factor of five (e.g., three thousand revolution per minute disks, circa 1985, versus fifteen thousand revolutions per minute disks in 2005).

In some embodiments, the read-write memory 250 or first memory element comprises multiple media elements interacting via Input/Output (I/O) aggregation and distribution methods analogous to RAID configurations. In some embodiments, the non-volatile memory 230 or second memory element comprises multiple media elements interacting via I/O aggregation and distribution methods analogous to RAID configurations.

In some embodiments, the read-write memory 250 may include one or more of DRAM (dynamic random access memory), SRAM (static random access memory), MRAM (magnetoresistive random access memory), SSD (solid state disc), conventional disc drives, R/W optical media, or any other form of memory suitable for real-time read/write functionality. The controller 220 is coupled to all of the read 238, write 240 and input/output 256 modules, although not all such interconnections are not shown in FIG. 2 for simplicity of illustration. The controller 220, in cooperation with the data storage information element 208, coordinates and regulates data exchanges involving one or more of the non-volatile memory 230 (via the buses 234 and/or 236), the read/write memory 250 (via the bus 254), the input/output switch 206 (via the bus 210 and/or 212) and external computation resources (e.g. host(s)) or data storage media coupled to the data recorder 200 via the bus 204.

In operation, temporal or working data are initially employed and stored in the read-write memory 250, and are, from time to time, transferred or "flushed" into the non-volatile memory 230, via processes described in more detail below with reference to FIG. 14 et seq. In some embodiments, the read-write memory 250 comprises a volatile memory, and the data recorder 200 includes a battery backup system (not shown), thus enabling contents of the read-write memory 250 to be transferred to the non-volatile memory 230, in the event of a power supply interruption or other system operations disruption.

Accordingly, the data recorder 200 provides combined storage and archival functions, such as are disclosed herein and which find particularized and greatly improved application in data storage, business continuity and/or disaster recovery (e.g., BC/DR) functions. The archived information is readily sorted, and selections from the archived data are available, in real time, and in conformance with suitable and individually-tailorable interfaces and security protocols (e.g. SONET, TCP/IP, USB, SCSI, ATA, SATA, SAS, SAN, Fiber Channel, InfiniBand, PCI, hypertransport or the like.), to one or more of a variety of hosts, via the interconnection 204, as one example. An embodiment presenting shared data recording capabilities contemporaneously available to multiple hosts and which may be combined with other capabilities, such as noted with respect to the embodiment of FIG. 2, is described below with reference to FIG. 3.

Figure 3:
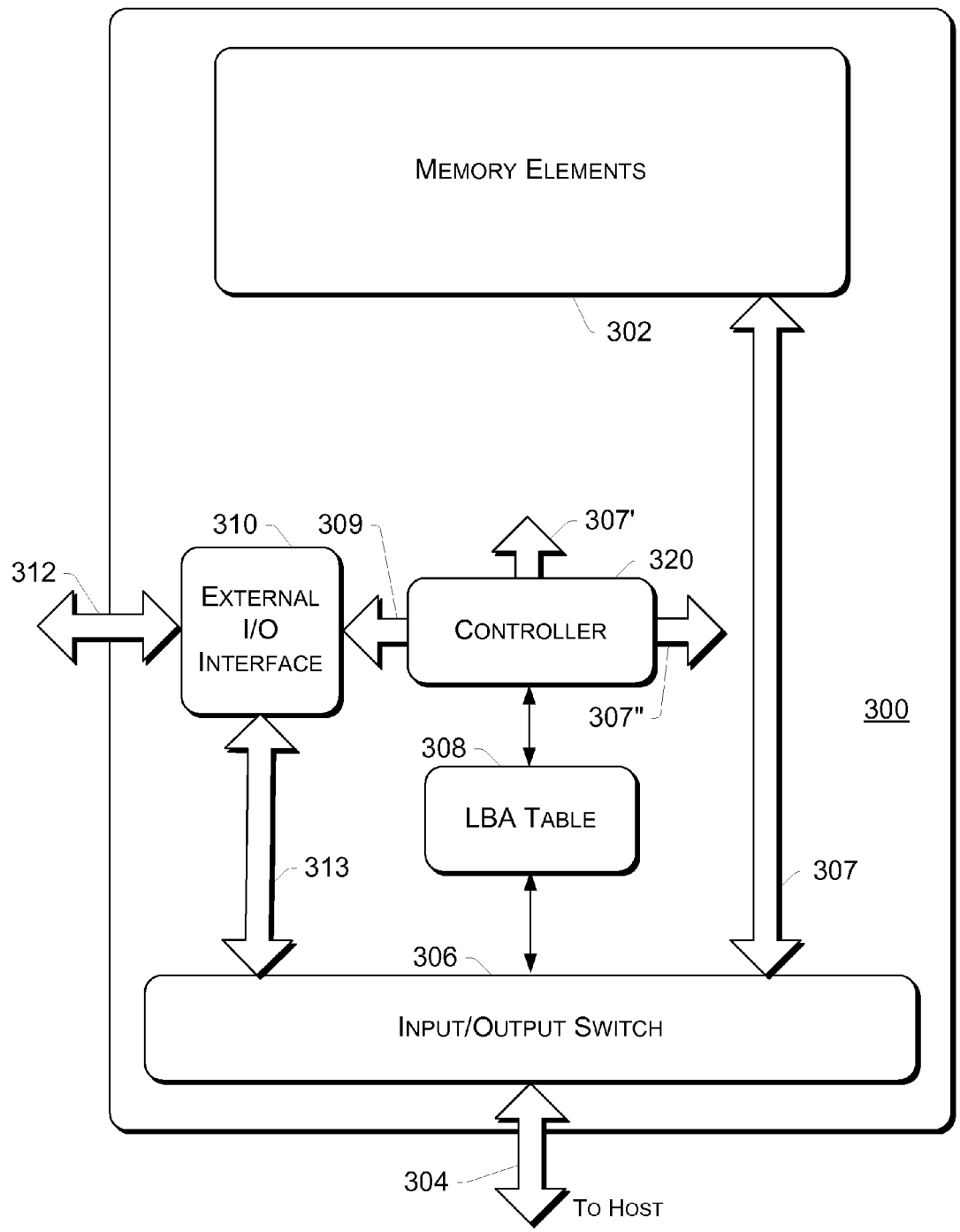
FIG. 3 is a simplified block diagram of an embodiment of a data recorder useful in the context of the environment of FIG. 1.

FIG. 3 is a simplified block diagram of an embodiment of a data recorder 300 useful in the context of the environment 100 of FIG. 1. FIG. 3 depicts data storage elements 302. In the block diagram of FIG. 3, the block 302 represents data storage capabilities analogous to the non-volatile memory 230, data storage elements 232(N), buses 234, 236, non-volatile memory read module 238, non-volatile memory write module 240, read-write memory 250, bus 254 and read/write memory input/output module 256.

An interconnection 304 is coupled to an input/output switch 306 and a bus 307 that also is coupled to the I/O switch 306. The bus 307 represents functions associated with at least one or more of the first bus 210 and second bus 212 of FIG. 2. The data recorder 300 also includes buses 307', 307" coupling various system elements together. A data storage device 308 (analogous to the data storage device 208 of FIG. 2) is coupled to the I/O switch 306 and includes an organizational table for stored data management, such as in the LBA (logical block address) table(s) 208 of FIG. 2, supra.

The block diagram of the data recorder 300 further includes buses 309 and 313 coupled to an external input/output interface 310, and a port 312 coupled to the I/O interface 310 for input/output or data exchange functions with one or more computing resources, such as hosts 102(N), other data recorders 300, or other network devices such as fibre channel switches and routers. A controller 320 coordinates data flow via the input/output switch 306 and bus 304 to exchange information between a primary host (not shown in FIG. 3) such as a client 102(1) (FIG. 1) and the data recorder 200/300, and also coordinates data communications through the external input/output interface 310 via the port 312.

The exemplary data recorder 200 of FIG. 2 may correspond, for example, to the data recorder 106 of FIG. 1, with the interconnection 204 providing analogy to the interconnection 108(1). The exemplary data recorder 300 of FIG. 3 may correspond, for example, to the data recorder 114 of FIG. 1, with the interconnection 304 providing analogy to the interconnection 108(2) and the port 312 providing analogy to the interconnection 104.

The bus 309, 313, I/O interface 310 and external interconnection 312 provide functionality that may serve one or more purposes. An example of such which provides significant advantages in comparison to prior art approaches includes rendering archival data regarding "snapshots" of system state available, in real time, to one or more host devices, for example as represented in a fashion analogous to how different drives are rendered accessible via operating systems such as the Windows® operating systems.

Another example of the functionality made available via the approach shown in FIG. 3 is capability for providing access to data stored in shared database elements (e.g., for coordination across a network or enterprise-level system, or to numerous clients via high connectivity couplings such as the Internet) or other computing assets needing access to such stored data. For example, driver software may provide a multiplicity of hosts 102(N) access to a plurality of archived states stored in the data recorder 200/300 via the I/O interface 310 and external interconnection 312, in addition to the access provided via interconnection 304 and I/O switch 306.

User review and selection, among entire states or backup snapshots of a given host status, or among individual files, may be effectuated by enabling users to search files from archived states or to build file catalogues. The archived states or file catalogue data may be rendered accessible for selection in much the same fashion as graphic user interfaces present multiple devices, drives, LUNs, logical volumes, file systems, etc. in DOS-based operating systems such as the Windows® family of operating systems or the UNIX® family of operating systems.

The benefits, when these operational capabilities are provided, either singly and especially when two or more are combined, result in powerful performance improvements in comparison to prior art data storage technologies and fulfill long-felt needs by making it possible to obviate the legacy resulting from prior art non-volatile memory and data storage devices.

In some embodiments, one or more of the components of the data recorder 200/300 shown in FIG. 2 or FIG. 3 can be redundant for a higher level of availability and fault tolerant solutions. In addition, in some embodiments, there can multiple instances of the primary port 204/304 and/or external port 312 for additional connectivity requirements.

In one embodiment, the external interconnection 312 and/or the interface 304 facilitate read/write activities vis-à-vis the shared data storage resource 302. Such shared data recording and exchange capabilities are consistent with scenarios where some or many different parties engaged in a common activity logically would find it desirable to have a pooled data storage capability reflective of multiple, independent actions executed via a corresponding plurality of actors or work stations.

In another embodiment or combined embodiments the external interconnection 312, the I/O switch 306 and the primary interface 304 can provide pass through capabilities for other recorders or hosts or in other words can route traffic to other recorders or hosts without effecting the controller 320 (or optionally with effecting the controller)

For example, when multiple point-of-sale transaction stations share a database that tracks receipts, inventory and the like, a number of different parties each are likely contemporaneously generating data that usefully is recorded in a common data storage element. In this context, among others, it may be useful to be able to provide current information for purposes of accounting and other administrative functions, and it may be useful to trigger (described below with reference to FIG. 14) multiple data recorders 200/300 in synchrony.

In use, data are archived in non-volatile memory, which may be organized in various ways and which are indexed via tables of location data. Examples showing how these aspects may be realized are described below with reference to FIGS. 4 through 6.

Archived Data Tabulation Examples

Figure 4:
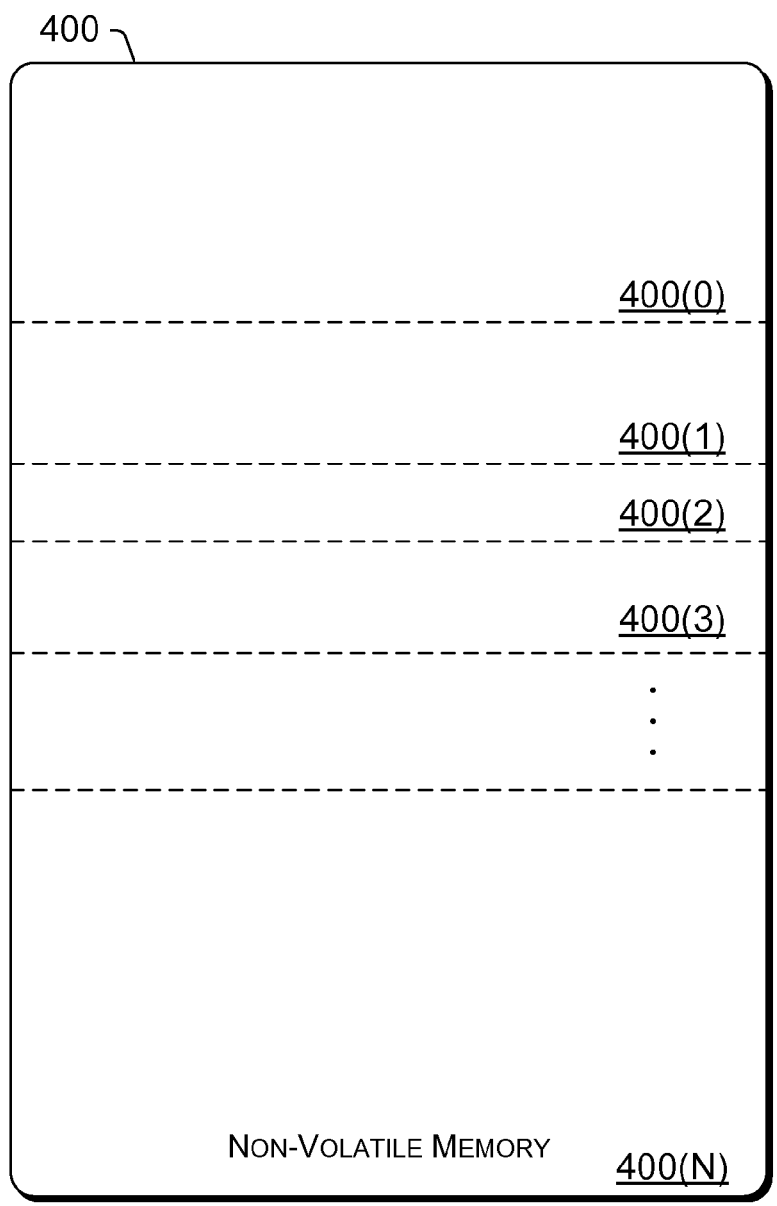
FIG. 4 is a simplified block diagram schematically illustrating a non-volatile memory useful as a portion of the data recorder of FIG. 2 and/or FIG. 3.
Figure 5:
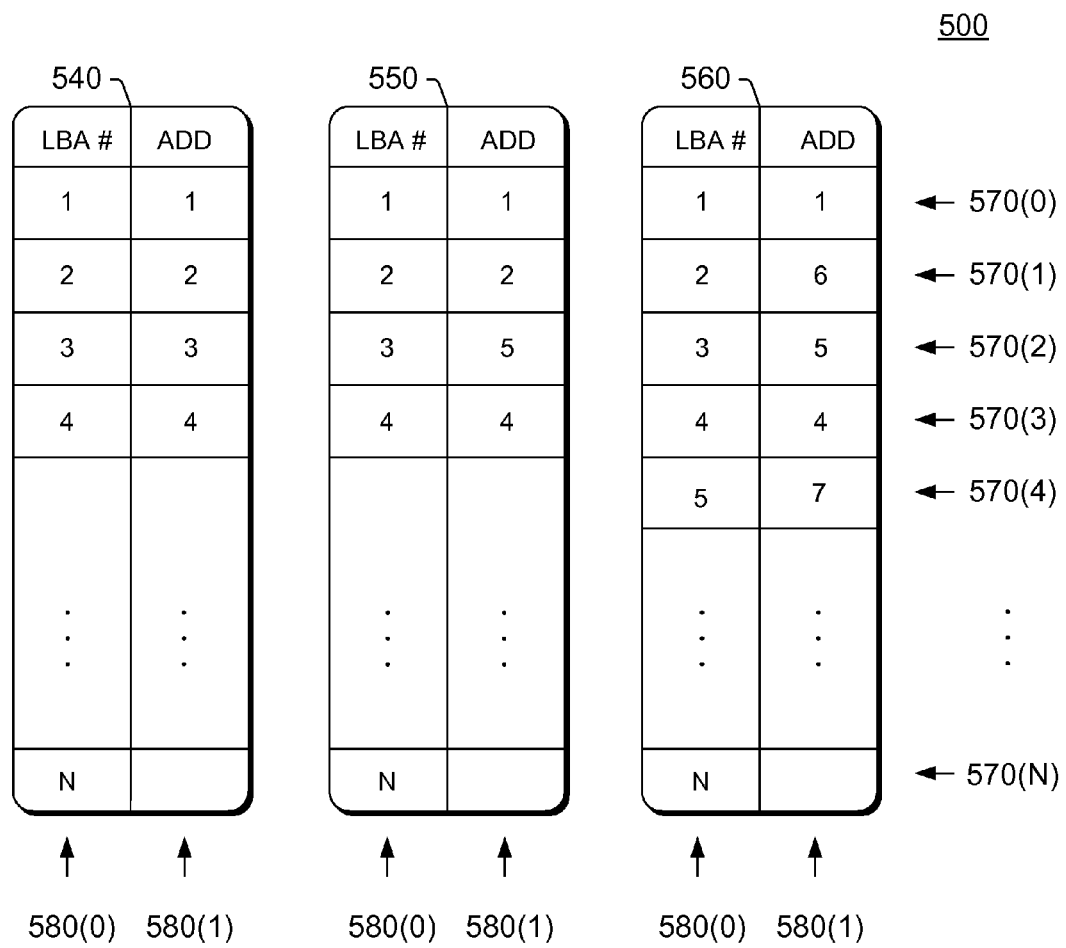
FIG. 5 illustrates a series of exemplary tables for translation of logical addresses to physical addresses.
Figure 6:
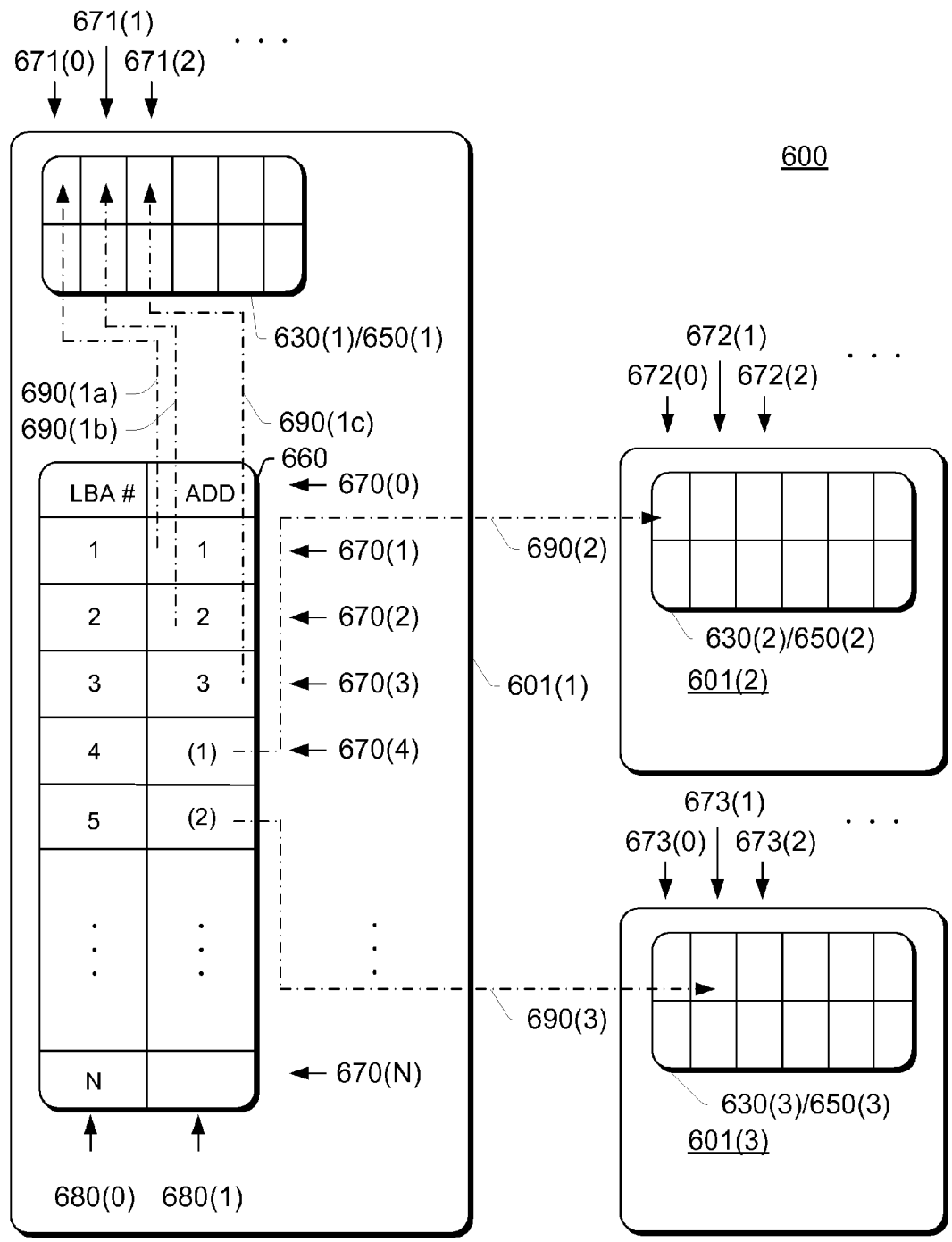
FIG. 6 illustrates exemplary operational postures with respect to tabular data structures such as described with respect to FIG. 5.

FIGS. 4 through 6 describe some aspects of how data are captured, catalogued, archived and/or accessed via the data recorder 200/300 of the preceding Figs. In general, metadata, such as LBA tables, LBA table history and other cataloguing information, are employed to track physical addresses for specific data elements and to render those available to hosts such as hosts 102(N) in a manner that is transparent to the hosts 102(N). The metadata may be employed to develop catalogues of data units, or to represent "snapshots" such as an ensemble representing the entire state of the data associated with a particular host.

These data may be accessed as individual elements, pages, blocks, files or the like, as represented at a specific point in time. These data may be accessed as a state of the entire collection of data associated with a particular host or temporal memory 250, and/or non-volatile memory 230, or 302 that has been captured at a specific point in time.

FIG. 4 is a simplified block diagram schematically illustrating a non-volatile memory 400 useful as a portion of the data recorder 200/300. The non-volatile memory 400 is depicted as having portions 400(0), 400(1), 400(2) and 400 (3) through 400(N), shown with dashed dividers indicative of potentially variable sizing or partitioning of memory asset allocations, and with ellipsis denoting portions elided in the view of FIG. 4. Portion 400(N) represents non-volatile memory that has not presently been written to/allocated, or which has been de-allocated, and is an example of what is termed a "free pool" of data storage capacity. In some embodiments, policies are set to ensure that a certain amount of storage or "guaranteed minimum free pool" is available for a particular host or other client. Portions 400(0) through 400(3) are analogous to the data storage elements 232(0) through 232(3), for example.

It will be appreciated that the non-volatile memory 400 may be subdivided, in the course of normal operations, and the subdivisions may be associated with multiple logical units or LUNs, for example to distinguish security attributes of data, state association(s), state presentation(s) or for any of many other reasons. In the context of security classifications, it may be appropriate to permit one class of hosts or users having one security classification access to one collection of data having one security classification and thus being sequestered into a first memory partition, and permitting another class of hosts or users access to at least another collection of data having another security classification and thus being sequestered into another memory partition. The one security classification may be subsumed within the another security classification, or the security classifications may be mutually exclusive.

In one embodiment, the non-volatile memory 400 of FIG. 4, the nonvolatile memory components of multifunctional data storage elements 302 of FIG. 3, and the counterpart non-volatile memory 230 of FIG. 2, may provide random access data read capabilities, or content-addressable read access, even for very large amounts of data, in real time. This is explained below in more detail in contrast to limitations of disc-type memories (and other spindle-based or any other type of electromechanical memories). In one embodiment, the nonvolatile memory 400, the data storage elements 302 and the memory 230 may include electromechanical memory elements and may include random access and/or content-addressable memory.

FIG. 5 illustrates a series 500 of exemplary tables or memory mappings 540, 550, 560 (or "snapshots"), analogous to the LBA tables 208 of FIG. 2 or 308 of FIG. 3, which, for example, may provide translation of logical addresses to physical addresses. In one embodiment, the tables 540, 550, 560 enable a host (such as a client 102) to treat the relevant data recorder as a block device, for example, in conformance with the legacy of conventions etc. associated with hard disc drive and/or other spindle-based data storage device management modalities.

The series 500 depicts the tables 540, 550, 560 as each representing information recorded as a result of a respective one of successive trigger events. These trigger events may be such as described above via the query task 1410 of the process 1400 of FIG. 14, for example.

The tables 540, 550, 560 are divided into rows 570(N) and columns 580(N). Solid lines are employed as divisions in the depiction of FIG. 5, between adjacent data groups, such as blocks or pages, and as represented via rows 570(0), 570(1), 570(2), 570(3), 570(4) . . . 570(N). The series of memory mappings 500 are shown as including a first column 580(0), corresponding to a logical address (e.g., logical block address or LBA #). These memory mappings 500 are also depicted as including a second column 580(1) (e.g., ADD or address), having a relationship to a physical address within a data recorder, such as the data recorder 200 of FIG. 2 or the data recorder 300 of FIG. 3.

In one example, the table 540 might represent a portion of memory recorder data at one point in time, such as following a triggering event such as is described below with respect to the query task 1410 of the process 1400 of FIG. 14. At another point in time, a table such as 550 or 560 might represent that portion of memory recorder data, albeit at a later point in time and reflective of changed data elements, such as following the processes such as those described with reference to FIGS. 14 through 18.

As shown more clearly in FIG. 6, the tables 540, 550, 560 may represent data storage reflecting data banking or storage banking. "Data banking" (see Introduction, supra) refers to "borrowing" by one data recorder or device of a relatively limited amount of data storage capacity in another data recorder, such as one or more pages in the instance of FLASH memory media. "Storage banking" refers to usage of a much larger portion, such as a partitioned portion or the entirety of, the data storage capabilities another data recorder. In other words, data banking refers to much finer granulation in borrowed capacity than storage banking.

In these applications, the data recorder is configured to share memory resources among a plurality of interconnected data recorders. This may be facilitated via the external interconnection 204 of FIG. 2 or 304 of FIG. 3, or through secondary interfaces, e.g., I/O interface 310 of FIG. 3. In either case, the LBA table(s) 208/308 are readily updated to reflect changes associated with this, that is, storage augmented via borrowing or sharing with one or more remote data recorder (s) can be pointed to by appropriate LBA entries.

Data banking or storage banking are situations where one data recorder, such as data recorder 112 of FIG. 1, determines that benefits would be obtained by employing data storage capabilities in another data recorder, such as data recorder 114 of FIG. 1, to accommodate part or all of a dataset where archiving, interactive data read/write and/or sharing, or other shared data pool requests are present. In such instances, the data accession information, such as is represented by the columns 580(N) (and as exemplified by the LBA tables stored in the data storage device 208 of FIG. 2 or 308 of FIG. 3) enables data communications between the host or hosts and the data storage capabilities of the associated data recorders in a seamless and user-transparent fashion.

This capacity for data storage and accession, and the flexibility and user transparency with respect to apparent data capacity of any one data storage device or structure, stands in marked contrast to protocols and modes of operation of the legacy of spindle-based data storage media, and promotes both accessibility and rapidity of data storage media access to extents unreachable via prior technologies. Data migration and seamless, user-transparent and rapid subsequent data exchange with data handled in such a manner is another area where the subject matter of the present disclosure stands in marked contrast to previously-employed data storage techniques.

Initially, the LBA columns ADD 580(1) in the table 540 (and/or tables 550/560) do not contain information pointing to any data address. As the host writes data into the data recorder 200/300, corresponding LBA entries denoted in the column ADD 580(1) will map to the physical locations of the memory media, in other words, using the appropriate entries ADD 580(1) will point to, indicate or correspond to the physical locations of the stored data.

For example, on a first day, or a defined period of any kind, the host writes four blocks of data (e.g., one through four, as noted in col. 580(0) of table 540)—and thus there are four corresponding ADD entries in rows 570(0), 570(1), 570(2), 570(3). Available data addresses are provided from a free media pool, and are mapped to these four LBA entries (one through four). Other entries in the LBA fields are not set yet, as represented by ellipsis. On a subsequent day, the host sends a request to re-write or update block three in row 570(2) (i.e., LBA #3), setting the physical address stored in that entry field to data address number five, as shown in column 580(1) of table 550.

In this example, the data recorder does not erase the memory portion previously pointed to by ADD #3, and the data recorder archives or tracks these LBA table changes for the future use. Similarly, at a yet later point in time, the host sends requests to de-allocate and then re-write data on LBA #2, and to write new data to LBA #5, and also archives these modifications so that table 560 reflects these changes. Eventually the deallocated memory potions can be released to the free pool, depending on the policies configured once/and/or any data required for other kept states has been migrated.

FIG. 6 illustrates exemplary operational postures via table or memory mapping(s) 600 for tabular data structures such as the series of tables 500 of FIG. 5. FIG. 6 depicts data recorders 601(1), 601(2) and 601(3), not all of which need be coupled to any one data table or memory mapping(s). The data recorder 601(1) is intimately associated with the memory mapping(s) 600, for example in the context of a data recorder 106 of FIG. 1 (i.e., captive to, or internal to, a single client/host 102(1)), or, in the context of a data recorder 128 (i.e., associated with server 120). The data recorders 601(2) and 601(3) are illustrated as being external to, but accessible to, data recorder 601(1), much as the data recorder 114 stands in relationship to the data recorder 112, or as the data recorder 130 stands in relationship to the data recorder 128. The accessibility facilitates the data/storage banking and data migration/cloning/consolidation/replication aspects noted above with reference to FIGS. 5 and 6.

FIG. 6 also shows LBA table 660, having rows 670(N) and columns 680(N). The data recorder 601(1) includes data storage media 630(1)/650(1) having data storage regions indicated via reference characters 671(N) (e.g., 671(0), 671(1), 671(2) etc.). The data recorder 601(2) includes data storage media 630(2)/650(2) having data storage regions indicated via reference characters 672(N) (e.g., 672(0), 672(1), 672(2) etc.). The data recorder 601(3) includes data storage media 630(3)/650(3) having data storage regions indicated via reference characters 673(N) (e.g., 673(0), 673(1), 673(2) etc.). The data storage media 630(1)/650(1), 630(2)/650(2), 630(3)/650(3) are analogous to data storage media 230/250 as discussed above at least with reference to FIG. 2.

Dot-dashed lines 690(1a), 690(1b), 690(1c), 690(2) and 690(3) indicate pointers, e.g., address information as stored in LBA tables for locating specific physical addresses via a logical address in a manner that is transparent to a host. The pointers 690(1a), 690(1b), 690(1c) indicate physical addresses corresponding to data storage locations in the data recorder 601(1) that is depicted as being physically associated with the LBA table 660, while the pointer 690(2) points to a data storage location associated with the data recorder 601(2) and the pointer 690(3) points to a data storage location associated with the data recorder 601(3).

The example of memory mappings of FIG. 6 depicts memory segments in 630(N)/650(N) of relatively fixed size, and thus denoted via solid lines dividing such, in contrast to variably-sized memory portions as represented via the dashed lines utilized in FIG. 4. However, usage of devices having relatively fixed size does not preclude division of the composite memory unit or drive into partitions via usage of virtual boundaries.

Using the disclosed subject matter coupled with virtual boundaries within memories such as non-volatile memory 400, one server or host can be given access to a selected partition within or spanning at least a portion of a physical unit or across multiple data recorders. For example, in one embodiment, presentation of one or more LUNs can be provided using conventional protocols and techniques.

In addition, multiple servers or hosts can be given access to a selected partition within or spanning at least a portion of a physical unit or across multiple data recorders. As an example, the LBA table 660 shown in FIG. 6 need not be the only LBA table associated with a physical unit or drive, in stark contrast with conventional approaches.

FIGS. 4 through 6 and associated text describe some data tabulation aspects. Several examples showing how these aspects may be employed are described below with reference to FIGS. 7 through 13.

EXAMPLES

FIGS. 7 through 10 depict various scenarios illustrative of how multiple data recorders may provide synergistic interaction to facilitate system operation. While FIGS. 7 through 10 show each data recorder being paired to a single host, it will be appreciated that one host may have more than one data recorder associated with it, and that data storage resource capabilities may be "borrowed" from another data recorder in the event that any data recorder experiences one or more policy violations, such as, capacity constraints, traffic congestion, data redundancy, etc.

Figure 7:
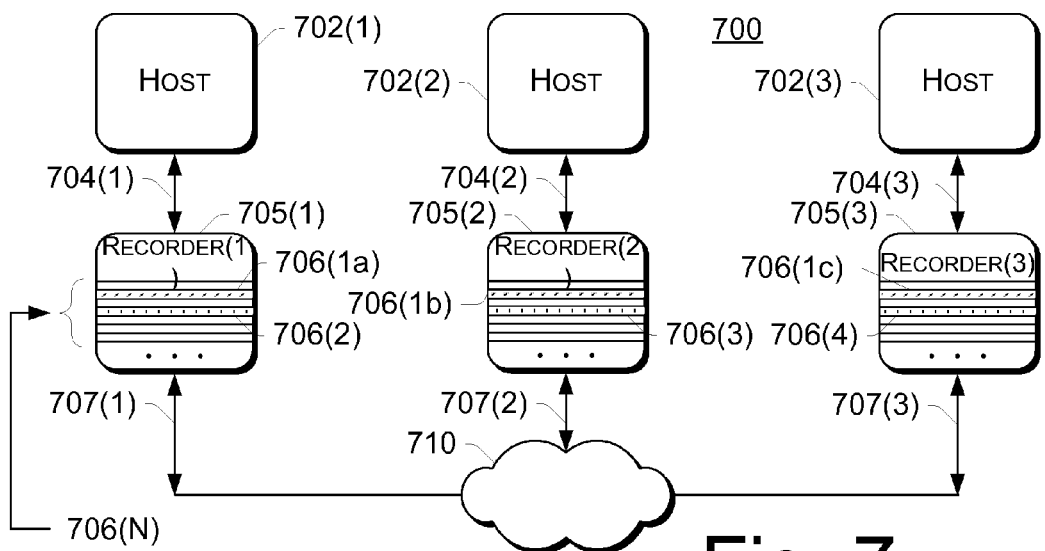
FIGS. 7 through 13 are simplified block diagrams depicting exemplary instantiations of data recorder resources reflective of data duplication, consolidation, migration, archiving and other functional aspects of computation resource leveraging consistent with the subject matter of the disclosure.

FIG. 7 is a simplified block diagram depicting a system 700 including a plurality of host or client computation engines 702(N) each coupled via primary data interfaces 704(N) to a respective one or more of a plurality of data recorders 705(N). Each of the plurality of data recorders 705(N) includes a multiplicity of data units 706(N).

Each of the plurality of data recorders 705(N) are coupled to one another through an external data interface 707(N) and/or network 710, such as a SAN, LAN, WAN or the Internet. The data recorders 705(N) may include solid state drives or memories comprising reprogrammable or programmable data structures, such as FLASH memory, MRAM and/or may include disc drives or other conventional non-volatile memory, and each data recorder 705(N) includes temporal memory capabilities analogous to those described above with reference to temporal memory 250 of FIG. 2.

The memory sub-elements 706(N), may, for example, represent divisions such as, or analogous to, logical blocks of 512 bytes, as employed in modern hard drives. The memory sub-elements 706(N), may represent divisions such as blocks of data or may represent pages, each comprising a fixed number of bytes of data storage, as are employed in the context of FLASH memories. The division of FLASH memories into pages/blocks arises because FLASH memory technologies are constructed such that program and erasure of stored data occurs in these page/block-sized increments. Alternatively, the storage media in the data recorders 705(N), and/or the manner in which the media is employed, may be such that unallocated portions of storage capacity are not required to represent any particular fixed size or granularity.

As represented in FIG. 7, each of the data recorders 705(N) have at least some data stored therein as noted by the record elements 706(N). The data units 706(1a), 706(1b) and 706(1c) represent identical, i.e., duplicate, data, while the data units 706(2), 706(3), and 706(4) represent unique data. As shown, each data recorder 705(N) is in communication with a host computer 702(N) via a primary data interface 704(N) (analogous to interconnection 304 of FIG. 3) and simultaneously in communication with a plurality of additional data recorders 705(N) via an external data interface 707(N) (analogous to port 312 of FIG. 3), which provides a number of distinct advantages over conventional systems, as described in more detail below. This configuration provides a stark contrast to conventional directly-attached storage (DAS) devices, in which data is isolated to the host.

Figure 8:
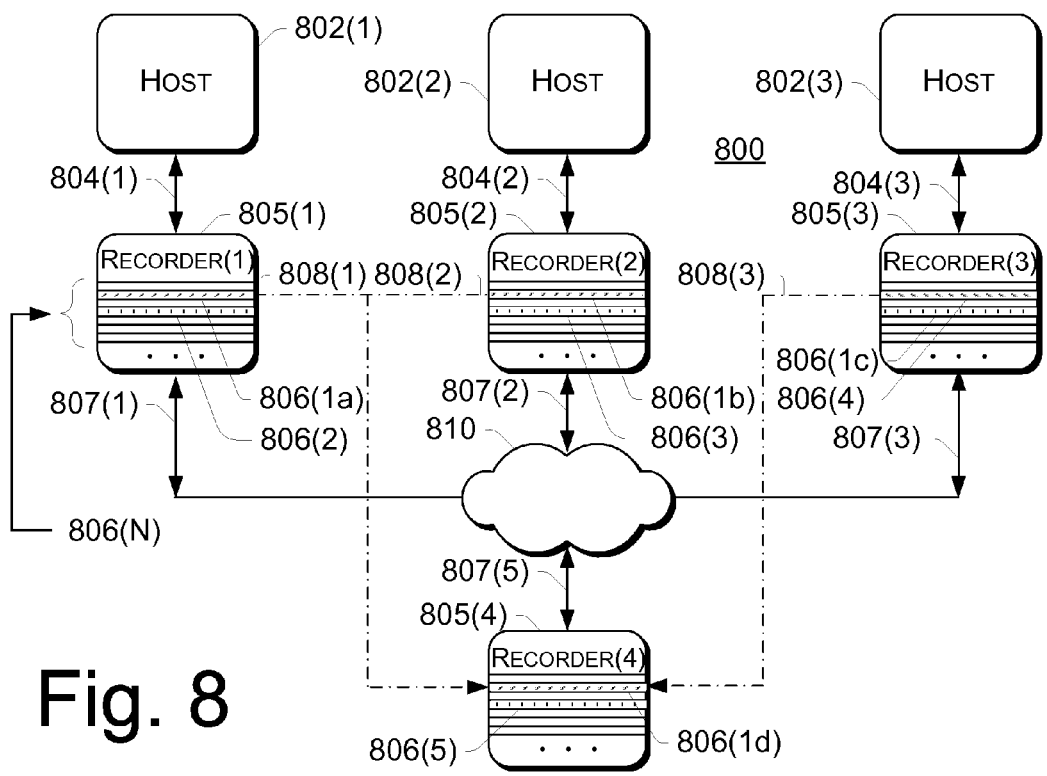

FIG. 8 is a simplified block diagram depicting a system 800 including a plurality of host or client computation engines 802(N) each coupled directly via primary data interfaces 804(N) to a respective one or more of a plurality of data recorders 805(N). Each of the plurality of data recorders 805(N) includes a multiplicity of data units 806(N).

Each of the plurality of data recorders 805(N) are coupled to one another through an external data interface 807(N) and/or network 810. The plurality of data recorders 805(1), 805(2), 805(3) is also coupled via an interface 807(5) to a data recorder 805(4). The data recorder 805(4) functions as a block server, providing added memory capabilities to the overall system 800.

In the data recorders 805(1), 805(2) and 805(3), respective data units 806(1a), 806(1b) and 806(1c) represent data units 806 that had been storing identical, i.e., redundant, data, while the data units 806(2), 806(3), 806(4), and 806(5), each represent unique data. Dot-dashed lines 808(1), 808(2) and 808(3) indicate pointers, e.g., address information as stored in LBA tables for locating specific physical addresses via a logical address in a manner that is transparent to the host 802(N).

The scenario depicted in FIG. 8 is one in which redundant data units or blocks 806(N) have been detected (e.g., see FIG. 18 and associated text), such as described with reference to data units 806(1a), 806(1b) and 806(1c). A number of conventional techniques for detecting redundancy are known, and several techniques may be contemporaneously operative in coordination with one another. These may run in "background" mode, i.e., employ idle processor time, and thus not interfere with primary tasks. Examples of techniques for detecting redundancy may "scrub through" blocks of data, detect "data signatures" (e.g., ECC, parity, indexing, etc.) to determine likely locations of redundant data with those likely locations being marked for more detailed comparison, or may rely on content addressable memories and related techniques.

Tiered approaches may also be used. For example, a high level approach to screening for duplicated data may use one or more techniques in combination such as reviewing data units with similar sequences, e.g., comparing data and/or a signature from data located at a specific data unit address in one data recorder such as data recorder 805(1) with data or a signature from data located at the same specific data unit address, but in another data recorder, such as data recorder 805(2).

In the example shown in FIG. 8, one or more of these techniques have been used to detect redundant data units or blocks 806(1a), 806(1b), and 806(1c), and the redundant data has been consolidated to block server 805(4) as data unit 806(1d). As shown, the LBA tables in the data recorders 805(1), 805(2), 805(3) include pointers 808(1), 808(2), 808(3) pointing to the new data unit 806(1d) in the block server 805(4) or, in other words, the pointers are updated in a manner analogous to that described with respect to the pointers 690(2) and 690(3) in FIG. 6. The blocks 806(1a), 806(1b), 806(1c) have been returned to the "free" pool of storage locations.

The above example illustrates one way in which the combined data storage capacities of the data recorders 805(N) reduce duplicate storage of data, increasing free storage space, via migration of content and consolidation in the form of a single data structure at a new location, together with suitable modification of LBA tables, and also ensuring that all of the hosts 802(N) are accessing identical versions of the data. The consolidation capability provides significant advantages in comparison to present-day systems, where, among other things, large amounts of storage capacity are devoted to duplicative data storage.

It will be appreciated that in appropriate circumstances, alternative scenarios are possible and may be indicated by consideration of existing traffic densities and the like. For example, consolidation may alternatively be effectuated through: (i) selection of an existing exemplar (e.g., data unit 806(1b), or any other exemplar) from a set of identified duplicative data structures (i.e., data units 806(1a), 806(1b) and 806(1c) in this example) in conformance with selected policy considerations; (ii) reduction of redundancy via deallocation of a remainder of the set of redundant data structures (i.e., deallocation of data units 806(1a) and 806(1c), in this example); (iii) return of the deallocated storage assets to the free pool; and (iv) appropriate modification of the effected LBA tables (i.e., the LBA tables of data recorders 805(1) and 805(3), in this example). It will also be appreciated that consolidation may occur among elements within a single data recorder 805(N).

Figure 9:
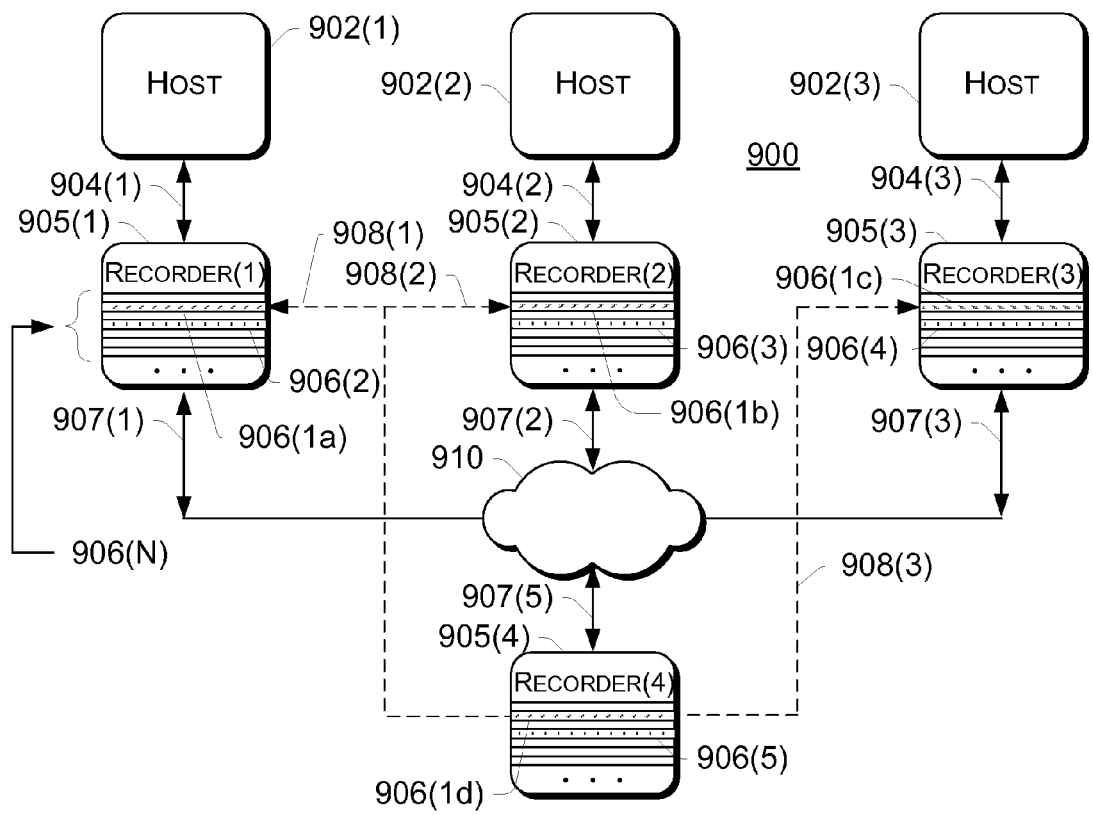

FIG. 9 is a simplified block diagram depicting a system 900 including a plurality of host or client computation engines 902(N) each coupled via primary data interfaces 904(N) to a respective one or more of a plurality of data recorders 905(N). Each of the plurality of data recorders 905(N) includes a multiplicity of data units 906(N).

The data recorders 905(N) each include a bank of memory sub-elements 906(N). Each of the plurality of data recorders 905(N) are coupled to one another through an external data interface 907(N) and/or network 910. The data recorder 905(4) acts as a block server and is coupled to the data recorders 905(1), 905(2) and 905(3) via interface element 907(5). Dashed lines 908(1), 908(2) and 908(3) indicate data migration paths.

FIG. 9 illustrates a scenario in which the three hosts 902(N) initially share the data unit 906(1d) and a policy determination is made that data unit multiplication is implied, as described below with reference to FIG. 17. For example, this policy determination may be made when congestion or bottlenecking is detected on network 910 (e.g., due to excessive requests for the data unit 906(1d)). In such instances, clones of the data represented by the data unit 906(1d) may be migrated to one or more of the data recorders 905(1), 905(2), 905(3) via migration paths 908(1), 908(2), 908(3), with corresponding updates to the appropriate LBA tables. When, for example, host 902(1) still encounters memory congestion, requests from the host 902(1) may be distributed among the cloned data units 906(1a), 906(1b) etc.

Figure 10:
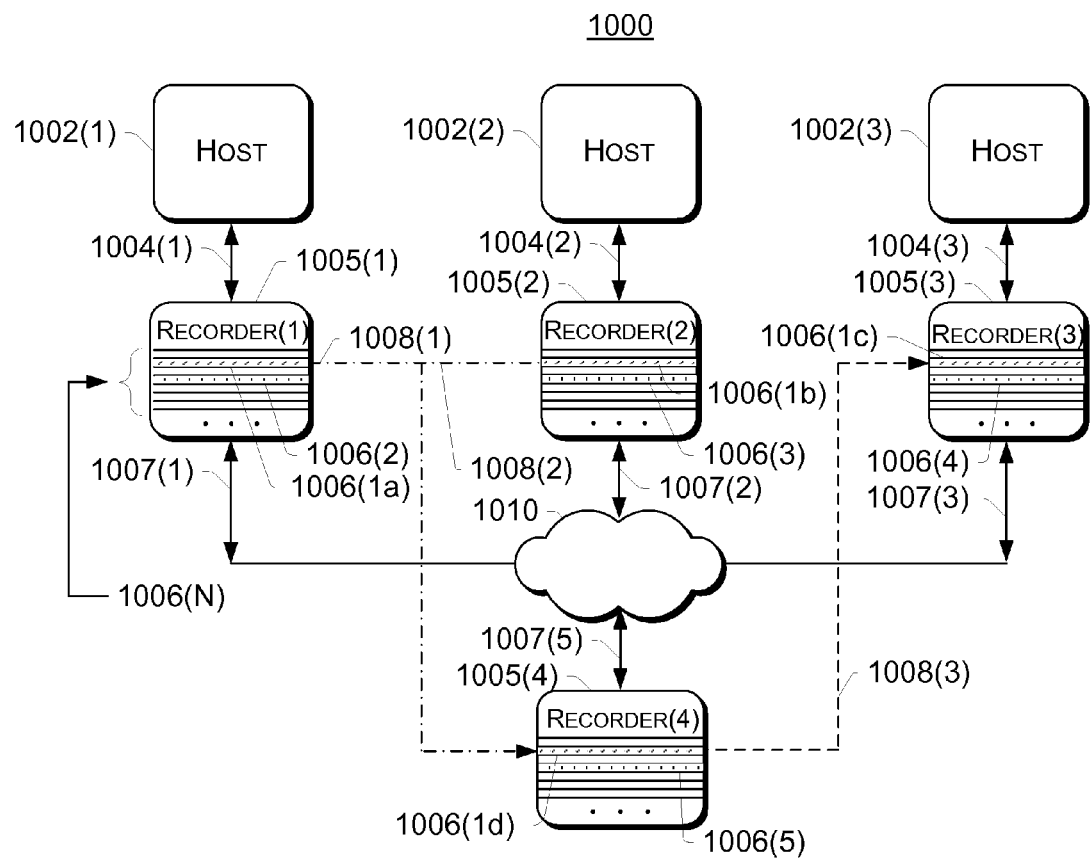

FIG. 10 is a simplified block diagram depicting a system 1000 including a plurality of host or client computation engines 1002(N) each coupled via primary data interfaces 1004(N) to a respective one or more of a plurality of data recorders 1005(N). The data recorders 1005(N) each include a bank of memory sub-elements 1006(N).

Each of the plurality of data recorders 1005(N) are coupled to one another through an external data interface 1007(N) and/or network 1010. The plurality of data recorders 1005(1), 1005(2), 1005(3) is coupled via an interface 1007(5) to a data recorder 1005(4). The data recorder 1005(4) functions as a block server, providing added memory capabilities to the overall system 1000. Dot-dashed lines 1008(1), 1008(2) indicate pointers and dashed line 1008(3) indicates a data migration/replication path.

Figure 18:
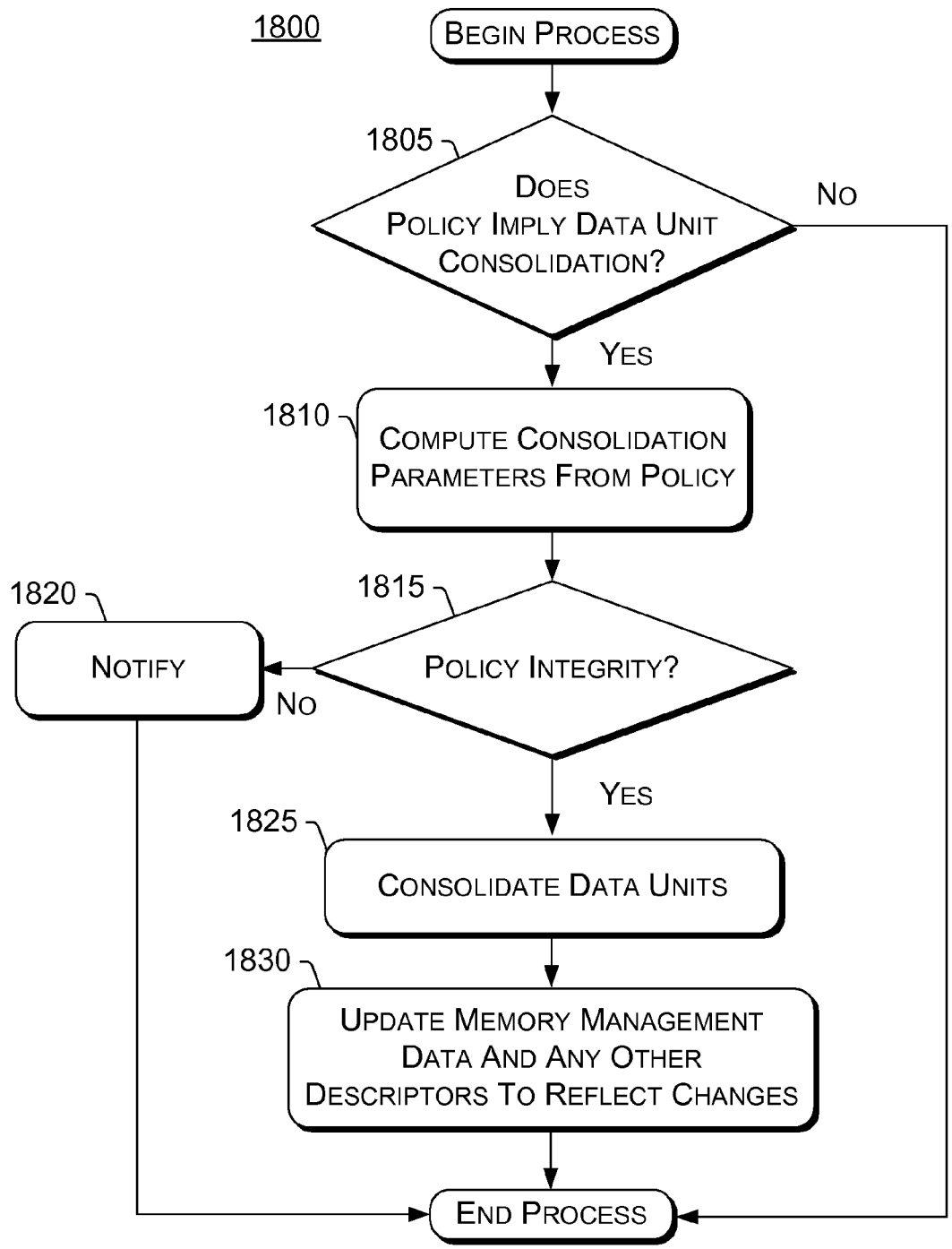

The scenario depicted in FIG. 10 assumes that the data redundancy reduction described in conjunction with FIG. 8, supra, and FIG. 18, infra, has previously occurred. However, a larger number of requests for the data represented by the data unit 1006(1d) have resulted in severe memory access congestion or bottlenecking. In one embodiment, it is determined that a substantial portion of those requests originate with the host 1002(3), and thus that migrating a cloned version of the data unit 1006(1d) to the data recorder 1005(3) that is coupled directly to the host 1002(3) promotes efficiency by reducing congestion due to accession request, and also via consideration of system traffic needs/efficiencies. As a result, a copy or clone of the data represented by the data unit 1006(1d) is created as data unit 1006(1c) within the data recorder 1006(3). Accordingly, the migration/replication path 1008(3) to the data unit 1006(1c) indicates that the cloned or replicated copy 1006(1c) of the data represented by the data unit 1006(1d) of the data recorder 1006(4) is also available in the data recorder 1006(3). Accordingly, routing of requests for such data may be facilitated, and bottlenecking may be reduced.

It will be appreciated that, using the techniques described above, data units can be automatically migrated among or within data recorders in accordance with configurable policies. Therefore, the data migration/replication capabilities provided via the disclosed subject matter can realize significant advantages and benefits over conventional data storage technologies and capabilities.

Figure 11:
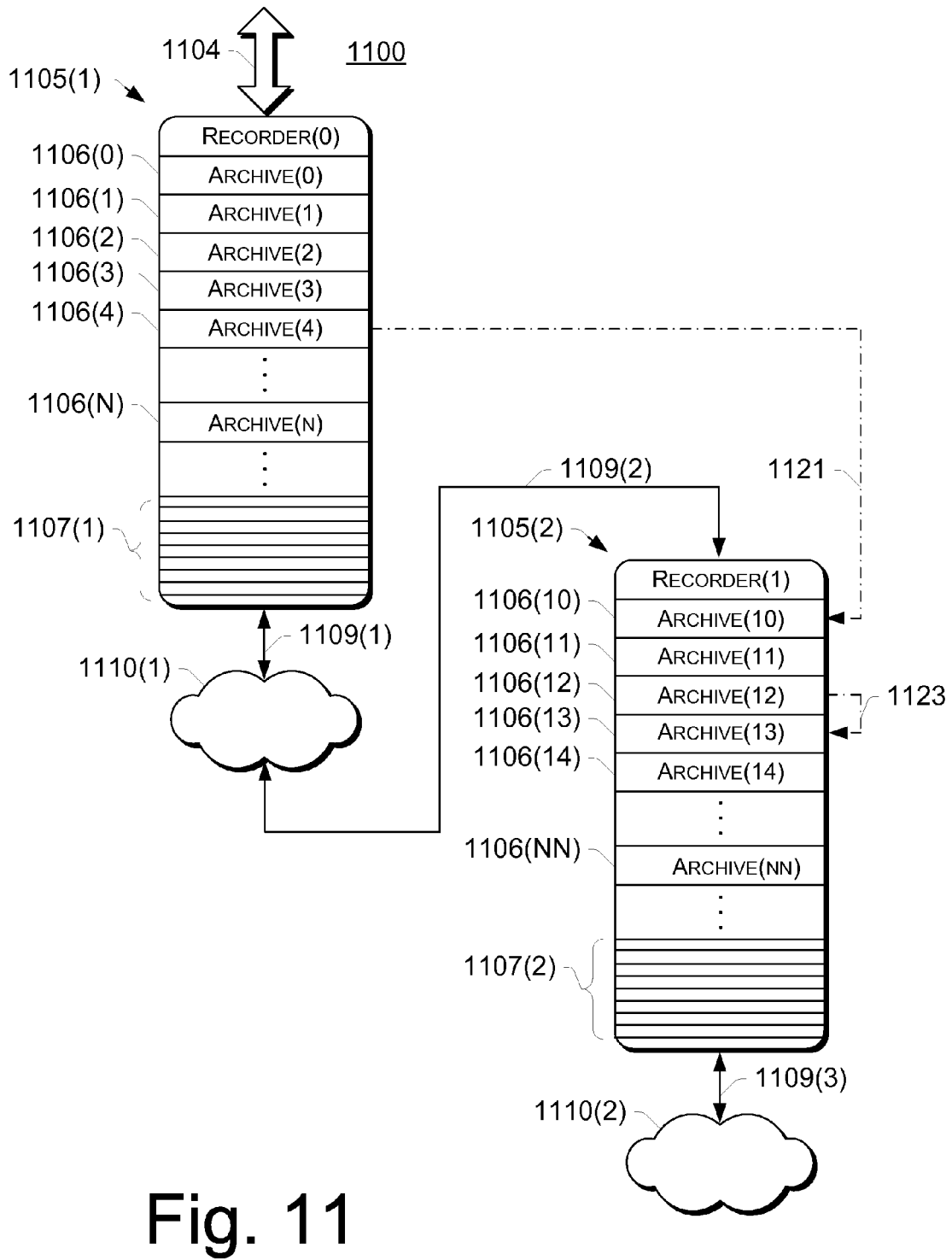

FIG. 11 is a simplified block diagram illustrating a system 1100 illustrating an expanded archives In the system 1100, external access to data, for example by a host or other device, is realized via a bus 1104 (analogous to interconnect 104 of FIG. 1, bus 204 of FIG. 2 etc.), with respect to data recorder 1105(1). Data recorders 1105(1)/1105(2) each include a respective bank of memory sub-elements 1106(N)/1106(NN) having archival data such as ARCHIVE(0)/ARCHIVE(10) through ARCHIVE(N)/ARCHIVE(NN) stored therein, and may include unallocated data storage assets 1107(N) (e.g., a free media pool). The data recorded in the data recorder 1105(2) represents an expanded archive.

The data recorder 1105(1) is coupled via interconnection 1109(1), and optionally via a network 1110(1) and interconnection 1109(2), for example in "daisy chain" manner, to the data recorder 1105(2). It will be appreciated that hierarchical or other tiered approaches and may be employed with a number of data recorders coupled in any suitable network configuration. Data may be independently archived via one or more stand-alone data recorders, in which instance there is not necessarily as direct a relationship as is involved when pointers are used. Dot-dashed lines 1121 and 1123 represent pointers.

Figure 14:
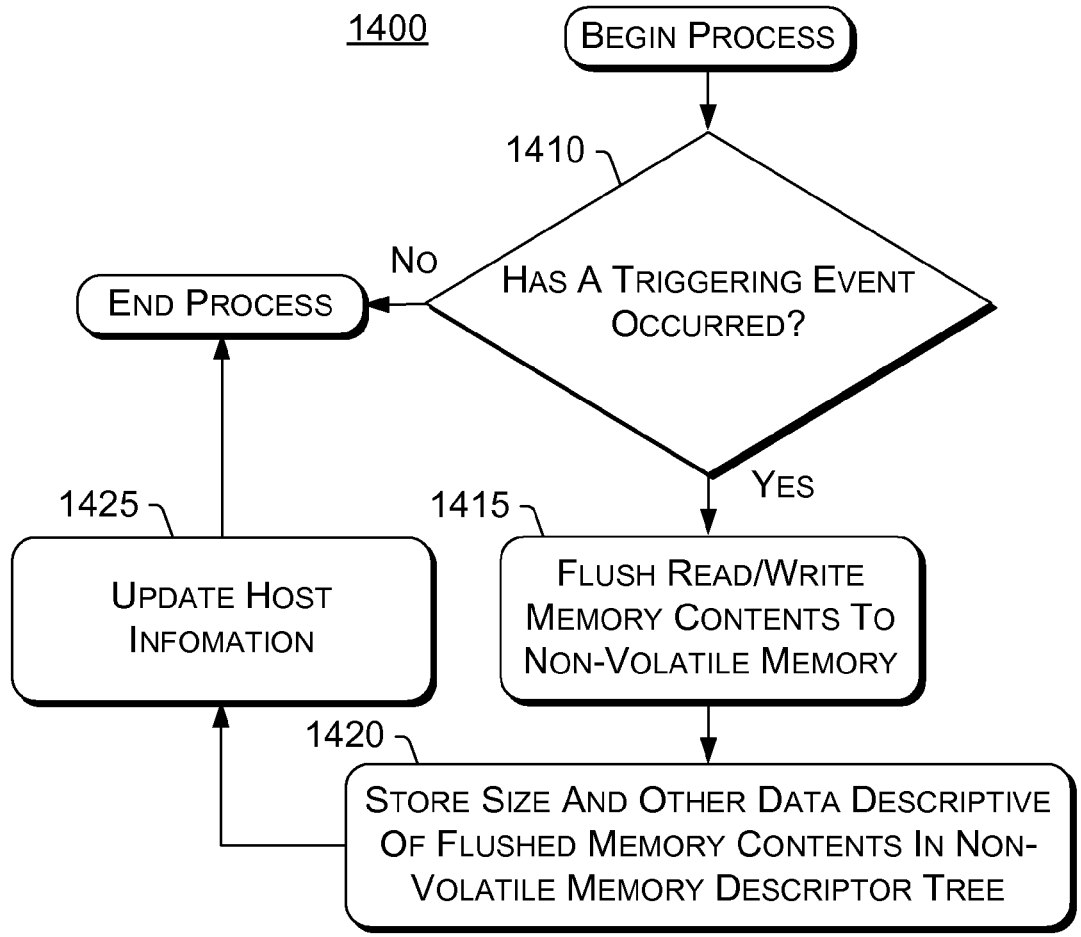
FIGS. 14 through 18 are flow charts descriptive of representative scenarios and processes relevant to recorded data mining, migration, cloning, performance oriented and directed accessibility moderation and redundant data elimination/recorded data compaction.

The "daisy chain" configuration of the data recorders 1105(1) and 1105(2) reflects a situation where the data recorder 1105(1) may store a sequential plurality of archived records, e.g., such as are created in conformance with the process 1400 of FIG. 14, where the triggering process (e.g., as associated with the query task 1410 et seq.) initiating capture of the data represented via the archives 1106 may be based on default or user-defined policies, or may have other origins.

In one example, the record 1106(0) ARCHIVE(0) may represent a first daily archive, the record 1106(1) ARCHIVE (1) may represent a second daily archive etc. However, such frequent formation of archives 1106 may result in limitations on the capacities of the data recorder 1105(1) and may also present many alternative options, for example for selection among for restoration of data, resulting in a lengthy list of archived states.

As a result, benefits may obtain via a second tier of policy-based provision of archival records, as represented via memory sub-elements 1106(NN) representing records 1106 (10) ARCHIVE (10) et seq. shown in association with data recorder 1105(2). In one embodiment, the record 1106(10) ARCHIVE (10) may represent, for example, an element within a policy-based subset of the archives 1106(1) ARCHIVE(1), such as a weekly archive or record. In FIG. 11, the record 1106(11) ARCHIVE(11) may represent a subsequent weekly archive, and so forth, with the pointer 1121 indicating that addressing information relative to these records 1106(NN) has been retained in appropriate LBA tables.

In another example, the records 1106(10) ARCHIVE(10) through 1106(NN) ARCHIVE(NN) act as a user-transparent extension of the data that is still stored in the data recorder 1105(1). As a result, the data recording capacity available for on-line access is increased.

In one embodiment, the interconnections 1109(1) and 1109(2), together with the network 1110(1), facilitate capacity by physically locating the data recorder 1106(1) and the data recorder 1106(2) in different facilities, in order to provide another level of assurance of data protection or continuity, for example despite natural disasters (weather-related phenomena, earthquake, etc.) or other issues that may result in destruction of one facility, but not the other. In similar fashion, the pointer 1123 indicates archives represented by record 1106(13) ARCHIVE(13) et seq. representative of an additional tier of policy-based provision of retained and archived data, such as one a month.

In contrast, present-day data storage technologies result in duplicative data but often do so in such a way as to not contribute to overall data integrity or archive capabilities or effectiveness and which in present-day systems may operate to decrease the integrity of these functions by permitting or even encouraging individual users to supplement a private copy of a body of data without being slowed by invoking a centralized data storage and aggregation function and thus creating versions of data including needed supplementary data but in ways generally inaccessible to others.

As a result, and very distinctive contrast to prior art approaches, real-time accessibility of archival data in multiple varying degrees of granularity may be achieved, without the encumbrance or failure rates associated with some spindle-based archival systems. Capacity for compliance with legal and other business-related concerns involved in maintaining complete records is enhanced (and this may be configured to be non-optional with respect to a particular host or group of hosts).

Figure 12:
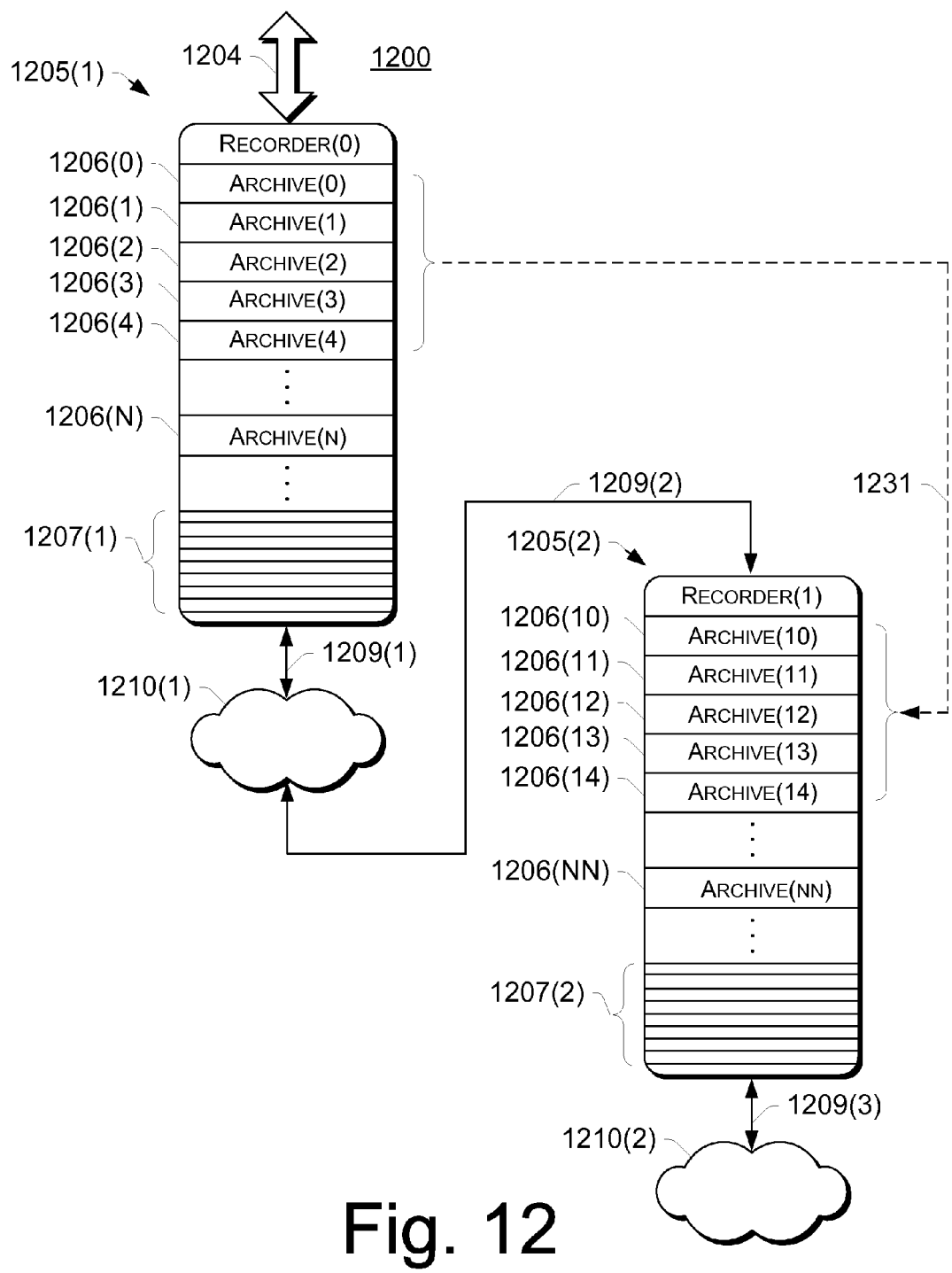

FIG. 12 is a simplified block diagram of a system 1200. In the system 1200, external access to data, for example by a host or other device, is realized via a bus 1204 (analogous to interconnect 104 of FIG. 1, bus 204 of FIG. 2 etc.), with respect to data recorder 1205(1). Data recorders 1205(1)/1205(2) each include a respective bank of memory sub-elements 1206(N)/1206(NN) having archival data such as ARCHIVE(0)/ARCHIVE(10) through ARCHIVE(N)/ARCHIVE(NN) stored therein, and may include unallocated data storage assets 1207(N) (e.g., a free media pool). The data recorder 1205(1) is coupled via interconnection 1209(1), and optionally via a network 1210(1) and interconnection 1209(2), to the data recorder 1205(2). Optionally, additional data exchange capabilities may be available via interconnection 1209(3) and/or network 1210(2). Dashed line 1231 represents single or multiple synchronous or asynchronous data replication paths.

The situation illustrated via the example of FIG. 12 includes depiction of one approach to redundant archival of data for security and integrity, and/or performance-related purposes. In the block diagram of the system 1200, a clone or copy of the record set 1206(0) through 1206(4) has been created in the data recorder 1205(2) as represented by the record set 1206(10) through 1206(14). It will be appreciated that while data recorders 1205(1) and 1205(2) are depicted in a manner suggesting that these are physically separate units (and may in fact be separate units, co-located in one facility, or, alternatively at diverse locations), for example, to provide a measure of security for business record recovery, the data recorders 1205(1) and 1205(2) may represent different portions or partitions within a single server. As a result, enhanced robustness of archival functionality may be realized.

Figure 13:
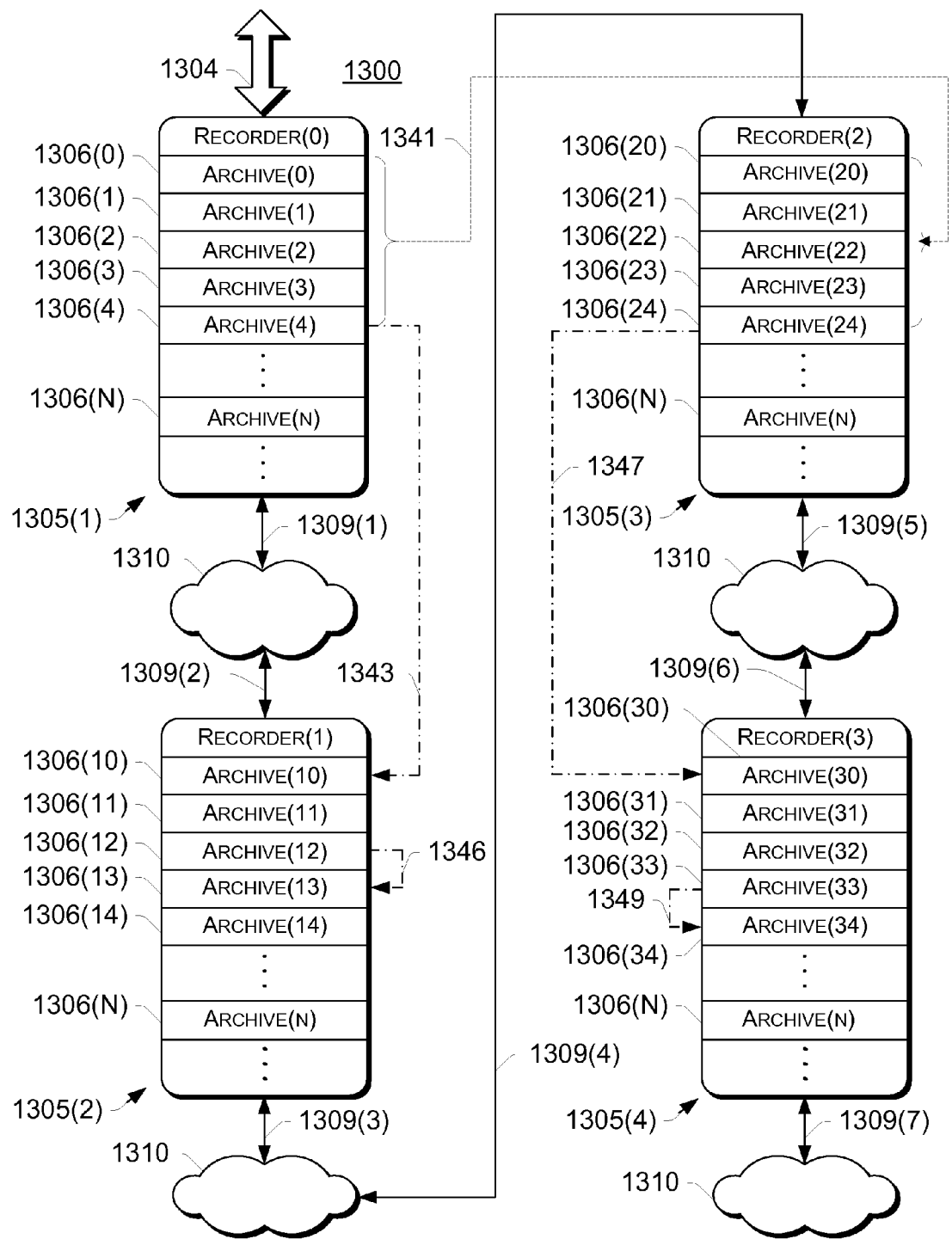

FIG. 13 is a simplified block diagram of a system 1300. In the system 1300, external access to data, for example by a host or other device, is realized via a bus 1304 (analogous to interconnect 104 of FIG. 1, bus 204 of FIG. 2 etc.), with respect to data recorder 1305(1). Four data recorders, respectively identified as data recorder 1305(1) (upper left), data recorder 1305(2) (lower left), data recorder 1305(3) (upper right) and data recorder 1305(4) (lower right) are shown in the example of FIG. 13. The data recorders 1305(N) each respectively include a bank of memory sub-elements, data units, or other divisions 1306(0) through 1306(N), corresponding to ARCHIVE(0) through ARCHIVE(N); 1306 (10) through 1306(N), corresponding to ARCHIVE(10) through ARCHIVE(N); 1306 (20) through 1306(N), corresponding to ARCHIVE(20) through ARCHIVE(N); and 1306(30) through 1306(N), corresponding to ARCHIVE(30) through ARCHIVE(N), with ellipsis denoting elided features and unallocated or "free pool" data recording assets, as previously described.

The data recorder 1305(1) is coupled via interconnection 1309(1), and optionally via a network 1310 and interconnection 1309(2), to the data recorder 1305(2). In turn, the data recorder 1305(2) is coupled via interconnection 1309(3), and optionally via the network 1310 and interconnection 1309(4), to the data recorder 1305(3). The data recorder 1305(3) is coupled via interconnection 1309(5), and optionally via a network 1310 and interconnection 1309(6), to the data recorder 1305(4). Dot-dashed lines 1343, 1346, 1347, 1349 represent pointers.

The data recorder 1305(1) includes a sequence of data units spanning data units 1306(0), labeled ARCHIVE(0), through 1306(4), labeled ARCHIVE(4), and such data units 1306 may represent, for example, policy-based snapshots such as daily archive records. The pointer 1343 indicates a subset of such data, which subset is stored in the data recorder 1305(2). These data units may be structured so that each element or division 1306 reflects one of a set of cumulative data, such as weekly snapshots, for a group of the data units 1306 stored in the data recorder 1305(1), in a manner analogous to that described above with reference to FIG. 11.

Data migration/replication path 1341 indicates a sequence of data units spanning data units 1306(20), labeled ARCHIVE(20), through 1306(24), labeled ARCHIVE(24), associated with the data recorder 1305(3), and these may represent redundant copies of the sequence of data units 1306 (0), labeled ARCHIVE(0), through 1306(4), labeled ARCHIVE(4) associated with the data recorder 1305(1), in a manner analogous to that described above with reference to FIG. 12.

It will be appreciated that formation of duplicative data units 1306, or subsets of data units 1306, or exchange of data units, for example in the context of for business continuity and data recovery purposes, may be accomplished via a number of different strategies. For example, data units 1306 illustrated with respect to data recorder 1305(3) and/or 1305(4) may represent data that are exchanged via a single, albeit large, data exchange bundle, i.e., accumulated data units achieving some predetermined criteria, such as time-based policy criteria or data-volume based policy criteria, may be archived in relatively large increments. Cloned or duplicative data may be provided directly from, for example, the data recorder 1305(2) to the data recorder 1305(4), however, a penalty in system traffic efficiency may be realized a result of such, and may represent logistical concerns in instances where physical separation representative of location diversity also results in such exchange via somewhat slower data distribution channels. In contrast, data exchange such as described above between the data recorders 1305(1) and 1305 (2) may be consistent with more efficient data traffic scenarios.

The data recorder 1305(3) is illustrated as being interconnected via network 1310 to the data recorder 1305(4), and, as suggested via the visual symmetry vis-à-vis the data recorder 1305(2), stands in relationship thereto analogous to that described above with reference to the data recorders 1305(1) and 1305(2). Alternatively, the data recorder 1305(4) may include records 1306 which, instead of being migrated/replicated versions of other data, stand in relationship to data associated with the data recorder 1305(3) via the pointer 1347 as being formed in conformance with separately-configured policies.

As a result, improved business continuity and data recovery capabilities are realized by the data cloning and archiving capabilities and strategies enabled via the disclosed concepts. These also augment flexibility and diversity in system and policy configuration, but with enhanced compliance capability vis-à-vis corporate objectives in efficient manner as well as providing increased robustness in a cohesive and policy-based manner achieving enormous benefits in comparison to prior art.

Operational Characteristics

In a disc-type memory having one or more discs rotating at a predetermined angular velocity, selected portions of the memory medium are accessed via a combination of: (i) moving a magnetically-sensitive head to a radius corresponding to one portion of the address (causing the head to "seek" the correct track), and (ii) adjusting timing such that the correct portion of the disc is brought to a physical location in proximity to the head via the rotation of the disc; followed by (iii) reading data and then (iv) repeating (i) through (iii) until the entire body of data has been read from the various portions of the disc on which selected sub-portions may have been stored. For further example, in a tape-type memory device, selected portions of data in the memory are accessed by: (i) selecting the correct tape, and mounting that tape on a tape drive; (ii) rotating the reel having the tape on it, and a take-up reel, to determine the correct portion along the length of the tape that corresponds to the data; (iii) reading data from the tape via a magnetically-sensitive head that is brought into proximity of the portion of the tape; (iv) advancing the tape until all of the information desired has been read from the tape; and (v) repeating (i) through (iv) when more than one tape storage unit, e.g., reel, cassette or the like, is required, for example, when data are spread across more than one tape storage unit, or when the archival function represented by one or more tape storage units fails.

In addition to latency associated with physical characteristics of the medium, delay involved in accessing data may be a function of other variables, including locating diverse portions of a single dataset that may be spread out over the physical medium. This occurs because data tend to be stored in chronological order, but a given body of data may be changed, at a number of different times. When information is later appended to a particular data group, those portions of the physical medium adjacent a portion of the medium where the data group had been initially stored etc. have almost always been employed to store other data. As a result, the appended information is written to a physically different area on the medium, and thus a single body of data may be written to the medium such that one portion is stored at a first location, a next portion is stored in a totally different area, and so forth.

Consequently, such data storage conventions give rise to need to record the multiple locations across which a single data structure may be written. One example of such is known as a file allocation table (FAT), and this is used to record the locations at which data are stored and translate the file name/identifier into one or an ensemble of physical addresses corresponding to locations at which these various portions have been stored, rendering the process transparent to the user, application etc. Another example is a logical block address table or LBA. The term LBA can mean either the address or the block or other memory segment to which it refers. Logical blocks in modern hard drives are typically 512 bytes each, which, in the current thirty-two bit addressing scheme gives a maximum capacity of two terabytes. Due to increasing need for very high storage data volumes, this may result in adoption of 2048 or 4096 bytes per block, or more, in the future. The upshot, however, is that in hard drive and other spindle-driven memories, accessing a stored body of data frequently involves multiple seek operations, each followed by rotation of the medium etc. in order to assemble and concatenate the portions into a sequential body of data.

Sequences involving rotation, head motion etc. may also be involved in reading of optical media, such as compact discs or DVDs, and in each of these instances, latency corresponding to mechanical delay in posturing the medium via a spindle-based technology plays a significant role in determining delay between specification of the data desired and provision of the data. Each of these types of memory involves data manipulation in the form of a serial bit stream, and, when this is accessed via electromechanical apparatus, the rate at which data are exchanged with the memory is much lower than a speed at which other elements of the computing system are able to operate.

In general, disc- and other spindle-based memory units are increasingly hampered by read/write access performance issues relative to increasing storage density. As the data volume capacity represented by them increases, these technologies fail to keep pace with the overall need. Additionally, because delays due to read/write access time may increase super-linearly, improvements in access times don't keep pace with increases in capacities. At present-day data volumes applicable to larger enterprise-scale networks, as much as twenty-four hours may be required in order to read stored data from a single three hundred gigabyte disc drive, and to write that data to another three hundred gigabyte disc drive. In some applications, multiple disc drives are ganged together, and are referred to as redundant array of independent disc (RAID) memories.

As an example, in a RAID I/O arrangement, a first group of discs are arranged so that data are written, in elementary chunks, across the first group of discs (e.g., one bit per disc or the like, also known as data striping), and data stored in the entire first group of discs is mirrored in a second group of discs. This increases robust aspects of data storage, but also requires coordination of data and further necessitates redundant data storage. Additionally, use of such a system doesn't relieve need for additional, archival data storage capability, such as tape backup/archival systems in current usage, where the tapes or other physical media are stored at a remote location. Further, distributed computing systems, where a number of computing resources are all accessing a common memory structure, require high capacity nonvolatile memory capabilities. However, as memory size increases, backup times increase, and, as a result, memory writes are taking place during backup operations.

In contrast, a random access memory is a memory employing a storage scheme that is capable of accessing any storage address in the memory with approximately equal delay. In other words, information stored in a random-access memory is accessible by supplying an identifier or address specifying where in the memory the information is stored, and accessing that information without incurring delay through need to manipulate the storage medium or the apparatus employed to access selected portions of the storage medium, or latency, devolving from characteristics of the medium.

Random-access memories have been fashioned using a variety of techniques for data storage, ranging from magnetically-based storage using toroidally-shaped magnetic media and meshes of wires, and, more recently, solid-state storage media accessed by switching transistors or other electronic switches each coupled to a reservoir such as a capacitor, a floating gate accessed via a tunneling dielectric, an island or nano-dot of conductive or semiconductive material or the like. Random access memories do not incur latency related to physical motion or manipulation of storage media, and thus are generally markedly faster in providing stored information, irrespective of where such information is located within the memory. Solid state drives or SSDs have been developed that employ solid state devices to provide large data storage capabilities without incurring the latency of spindle-based memory technologies and which are also able to be compatible with the legacy of systems and software often presently employed to coordinate with spindle-based data memories.

Some types of random access memory may incur latency due to need to "refresh" data in the memory. For example, dynamic random access memories or DRAMs use a transistor and a small capacitor to form a "1T1C" (one transistor, one capacitor) memory cell, and the charge (data) stored in the capacitor must be periodically read out of the capacitor, amplified, and the stored again in the capacitor, however, "refresh" cycles typically involve much less latency than is associated with spindle-based technologies.

In some embodiments, the non-volatile memory 230 shown in FIG. 2 includes random-access solid state memory. For example, in one embodiment, the non-volatile memory 230 includes memory based on tunneling of charge carriers through a dielectric or other electrical barrier into or out of a storage region, with an amount of stored charge or an absence of stored charge corresponding to information stored in the storage region, such as a logical ONE (e.g., corresponding to at least a predetermined amount of stored electrical charge), or a logical ZERO (e.g., no stored, or a different amount of stored, electrical charge). Examples of conventional non-volatile random-access solid state memories include MRAM, FLASH memories, such as NOR FLASH and NAND FLASH memories.

NOR FLASH memories have conventionally been used to store relatively small amounts of executable code for embedded computing devices, such as personal digital assistants and cell phones. NOR FLASH memories provide rapid data read capabilities, but incur latency in data erasure and in data writing. NOR FLASH memories find application in storing executable programming or code, due to reliability, rapid data read operations, and random access capabilities. NOR FLASH memories find application for storing firmware, boot code, embedded operating systems, and other data that change infrequently, but which do change from time to time, or where different units sharing a common hardware platform may be tailored to one of several distinct deployment scenarios via incorporation of software/data suited to the respective intended usage, in part because such code can be directly executed from the memory. In contrast, NAND FLASH memories are newer than NOR FLASH memories and provide advantages for non-volatile solid state storage, for reasons such as cost, component densities, better recording performance, and the like.

Although FLASH memories can be programmed on a bit-by-bit basis, resetting bits from zero to one cannot be done individually. Altering data stored in FLASH memories is done via resetting (or "erasing") an entire block of data at a time. As a consequence of tunneling-based aging of the dielectric through which the charge tunnels, the useful lifetime of a FLASH memory chip is measured against a projected maximum useful number of such erase cycles, with the typical lifetime being 100,000 erases per block. In turn, this limits application of FLASH memory for applications in which data are frequently updated in place, such as swap files. Thus, when FLASH memories are employed in solid state drives, wear-leveling techniques that track usage and transparently relocate the data from highly utilized portions of the FLASH memory to less highly utilized portions are employed.

In the next section, several processes finding utility in the context of the data recorder 200 of FIG. 2 or 300 of FIG. 3 and/or the environment 100 of FIG. 1 are described. Additionally, advantages associated with these processes and data recorder are briefly discussed.

To recapitulate, FIGS. 7 through 13 are block diagrams depicting exemplary instantiations of data recorder resources reflective of data duplication, migration, archiving and other functional aspects and enhancement of computation resource leveraging consistent with the data recorder 200 of FIG. 2 and 300 of FIG. 3. In the next section, processes useful in deployment of such assets are described.

Representative Processes

In the previous sections, descriptions of an environment 100, and of the data recorder 200/300 useful in that context, were provided. In this section, processes finding utility in cooperation with the data recorder 200 of FIG. 2 and/or 300 of FIG. 3 are described with reference to FIGS. 14 through 18. FIG. 14 describes a flush process 1400 that is performed in conformance with policy configuration management parameters that may be set via the process 1500 of FIG. 15. The process 1400 begins in a query task 1410.

Access may be provided to a single computing resource (as with client 102(1) of FIG. 1), to a host, a network (e.g., as with the data recorder(s) 128, 130 etc. of FIG. 1) or to an enterprise-level system (e.g., as with the data recorder(s) 112, 114 etc.).

Figure 15:
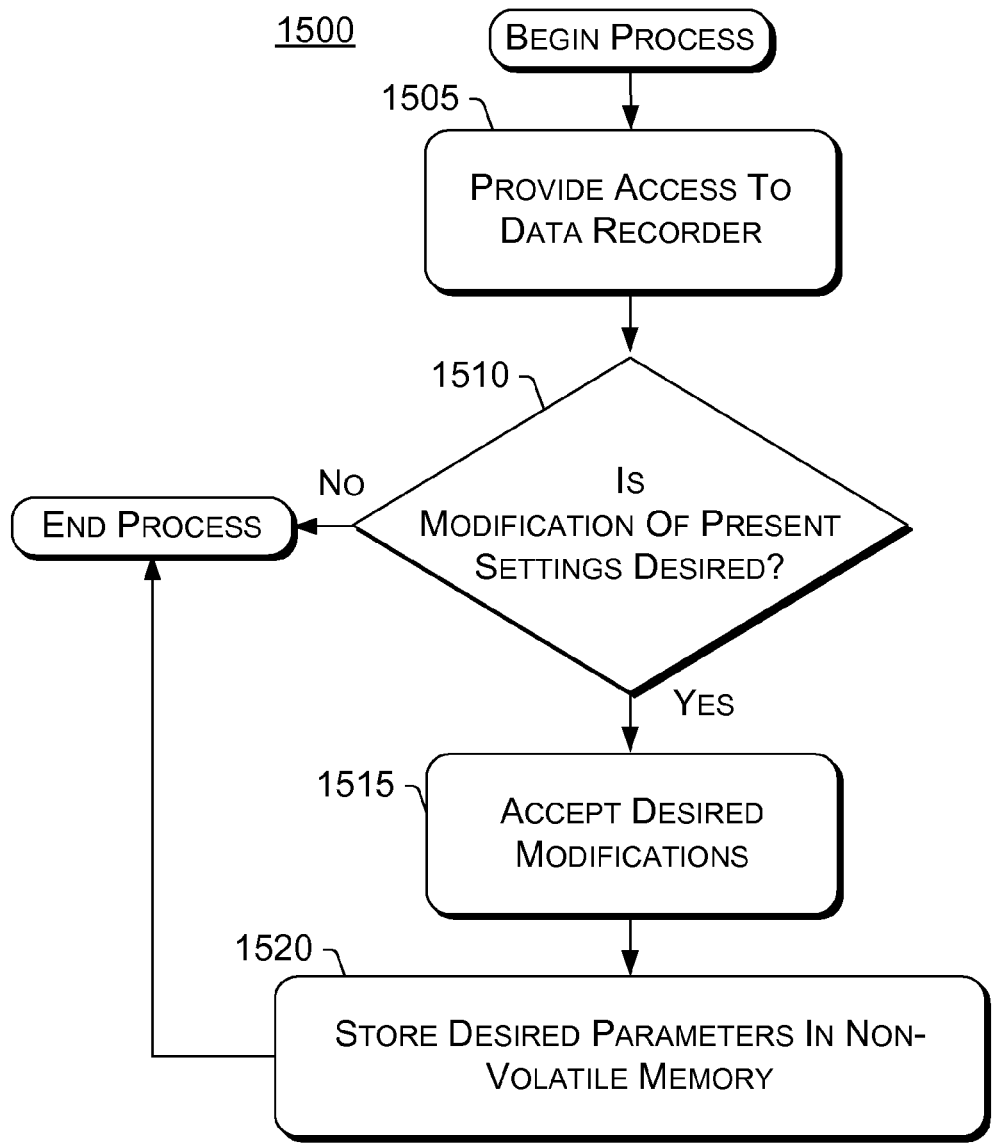

The query task 1410 determines when a triggering event has occurred, for example in conformance with the parameters and settings set via the process 1500 of FIG. 15, infra, and which may be invoked via the data recorder, or in response to a request from the host computing device, and which may be synchronized with triggering other data recorders as well. When the query task 1410 determines that a triggering event has not occurred, the process 1400 ends (or, viewed from a different perspective, the process 1400 restarts). When the query task 1410 determines that a triggering event has occurred, control passes to a block 1415.

In the block 1415, the temporal memory 250 is "flushed" in conformance with policy management parameters as described below with reference to FIG. 15, but with at least changed data elements reflected in the content of the temporal memory 250 being recorded, as well as the state of the system. Information corresponding to the new location for the data flushed to the non-volatile memory is also stored via refreshing the LBA table and archiving those changes (block 1420). In one embodiment, only changes in data or other computer-readable instructions (e.g., application programs, operating system components etc.) are recorded via the block 1415, however, as a result, information contained in the non-volatile memory 230 permits the entire state present at the time that the block 1415 is invoked to be accessed in real time. In one embodiment, the entire state or portions of the entire state, including portions that have changed since a last invocation of the block 1415, are captured via the block 1415. Control then passes to a block 1420.

In the block 1420, information descriptive of the data recorded via the block 1415 are stored. Examples of such information include LBA table changes, sizes of individual files or data structures that were recorded, information facilitating translation of user-amenable descriptors to physical addressing data, a time at which the block 1415 was invoked, times descriptive of when changed data were modified, and by what entity or program, and the like. Control then passes to a block 1425.

In the block 1425, host information is updated. For example, the temporal memory 250 and thus any devices that are interacting with the temporal memory 250 are provided with capability for accessing information indicative that memory contents have been recorded. In one embodiment, updating information via the block 1425 includes appending the recorded state to a menu of available recorded states. The process 1400 then ends.

The process 1400 thus ensures that sequential snapshots of data files and other software structures are archived and available. The process 1400, coupled with minimum multiplicity policy, may function as a backup capability, for example, instead of usage of tape drives etc., since it reproduces previous states of the data which in turn can be used to restore the data to a point in time when each flush occurs.

FIG. 15 shows a flowchart describing a process 1500 for setting policy configuration management parameters that finds utility in the context of the data recorder 200 of FIG. 2 or 300 of FIG. 3. The process 1500 begins in a block 1505.

In the block 1505, the process 1500 provides access to the data recorder 200/300. Access to the data recorder 200/300 includes making settings applicable to the data recorder 200/300 and operation of the data recorder 200/300 available for inspection, such as via metadata rendered accessible via the interface 310 of FIG. 3 or the I/O switch 206/306. Such settings may be default settings, or may be settings previously determined via a process such as the process 1500. Control then passes to a query task 1510.

In the query task 1510, the process 1500 determines when modification of present settings affecting operation of the data recorder 200/300 is desired. When the query task 1510 determines that modification of the present settings is not desired, the process 1500 ends. When the query task 1510 determines that modification of the present settings is desired, control passes to a block 1515.

In the block 1515, desired modifications to settings affecting operation of the data recorder 200/300 are accepted. Settings that a user, host, another computing device, computer process, computer program, application, database or system administrator might wish to determine or set in order to trigger data recording or state recording by the data recorder 200/300 (described supra with reference to FIG. 14) may include: (i) a setting that causes system status to be stored in the event that a power supply interruption or other disruption is detected; (ii) a schedule; (iii) setting the data recorder 200/300 to flush the temporal or read/write memory 250, or record system state, when a predetermined time has passed, or, in other words, to record system state for the data recorder(s) 200/300 at predetermined intervals; (iv) a setting the data recorder 200/300 to flush the temporal or read/write memory 250 when a predetermined volume of data have been modified, or, in other words, to record system state in data groups of relatively similar size; (v) capacity management-related factors as specified via policy; (vi) a power-on-reset event or other system event indicating that data capture at one or more tiers is appropriate; or (vii) to combine one or more such trigger events, to ensure that when at least one predetermined threshold has been achieved, system state, including modified information, is stored in the data recorder 200/300. Additional examples of configurable settings, or policy-based criteria, are described below in reference to FIGS. 17 and 18. Control then passes to a block 1520.

In the block 1520, the settings selected in the block 1515 are stored in non-volatile memory. In one embodiment, at least some of the settings are stored in non-volatile memory in the data recorder 200/300. In one embodiment, at least some of the settings are stored in non-volatile memory external to the data controller 220/320, but accessible to the data recorder 200/300. The process 1500 then ends.

The processes 1400 and/or 1500 may be employed in tiered fashion and may be set such that one or more are invoked in a background fashion. In other words, at a highest administrative level, a designated party or group of parties having administrative oversight and enforcement functions delegated thereto may employ the process 1500 to invoke or set a corporate policy across an entire network or corporate domain or across one or more subsets of hosts within such. At a lower level tier, a work group or other group may implement policies within the context established at the highest administrative level affecting policies within that group. At a still lower level, an individual user or host may invoke yet another layer of policy within the boundaries of the policies established by higher administrative tiers.

Figure 16:
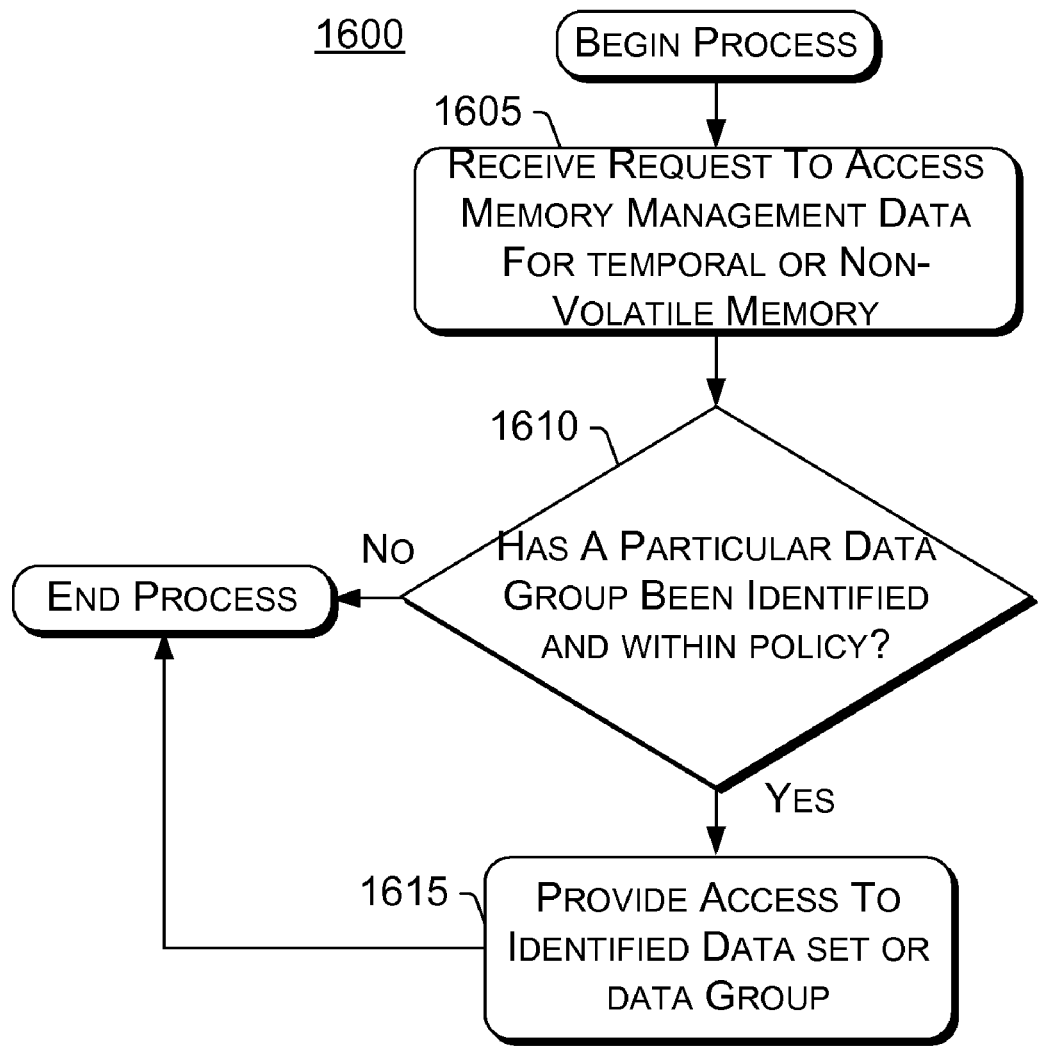

FIG. 16 shows a flowchart describing a process 1600 that finds utility in the context of the data recorder 200 of FIGS. 2 and 300 of FIG. 3. The process 1600 begins in a block 1605.

In the block 1605, the process 1600 receives a request to access memory management data relevant to the non-volatile memory 230 in the data recorder 200 of FIG. 2. The request may be made by a user reviewing a current or archived state presentation such as a menu similar to a list of drives or partitions within a drive, for example, with menu entries corresponding to a series of archived states available for real-time use and/or recall to the user. Control then passes to a query task 1610.

The query task 1610 determines when a particular data group representative of a particular archived state or data set has been selected or identified. For example, when a user determines that a dataset being used or accessed has been corrupted by an error that has just occurred, or that a program or operating system error that has just occurred requires correction, an archived state from a most-recently prepared archival record might be selected. When a user wishes or needs to recall a less-recent dataset or system state, a different, earlier archived record or dataset might be selected. Control then passes to a block 1615.

In the block 1615, access is provided to the identified archival record or data group, such as a LUN, a partition etc. The access permits real-time restoration of the system or dataset to a prior state that has been stored or recorded via the data recorder 200. The process 1600 then ends.

Data and state presentation and restoration capabilities and archival functions are thus achievable in ways that result in significant reduction of both hardware and software overhead required in present-day approaches. Functions previously addressed via a combination of disc and tape approaches, which result in backup and archives that require specialized software, which cannot be achieved without increasingly unrealistic time requirements in order to prepare a copy of data that must be archived for business compliance, continuity and data recovery purposes, and which incur significant latency in providing archival records for data restoration purposes, in strong contrast to data storage backup technologies in the disclosed art herein.

Figure 17:
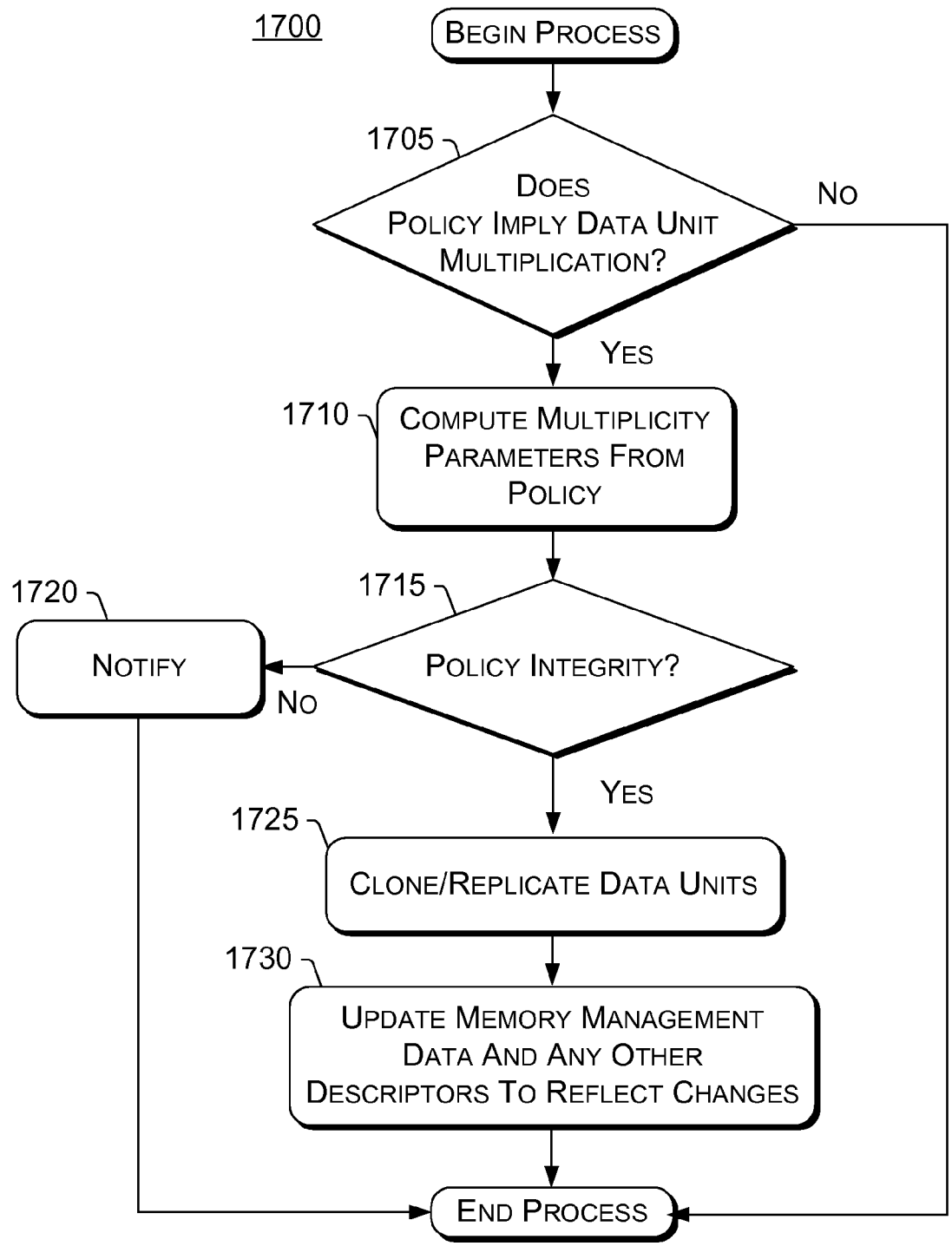

FIGS. 17 and 18 are simplified flow charts descriptive of representative processes relevant to recorded data mining, migration, cloning, replication, consolidation, multiplication and redundant data elimination/recorded data compaction.

FIG. 17 is a flow chart of a process 1700 relevant to "cloning" and "replication" of one or more data units (e.g., creating additional copies, in diverse memory areas, of data groups within a recorder, creating additional copies across multiple data recorders, etc.) in an environment such as depicted in varying forms in FIGS. 7 through 13, supra.

The process 1700 applies to data recorders including data recorders coupled to a single computer or client (e.g. 106), shared data recorders, and/or networked data recorders such as 112, 114, 128, 130 as shown in FIG. 1, for example, and serves in operating a data multiplication policy engine in such data recorders.

The query task 1705 determines, based upon management policy, and other relevant facts and circumstances, when data unit multiplication is implied. Examples of policy-based criteria and acts include any combination of one or more of purposes and operations such as: (i) performance reasons; (ii) data integrity and/or stability; (iii) data redundancy; (iv) data migration; (v) storage banking and/or data banking; (vi) extended archiving; (vii) data replication; (viii) data backup; (ix) capacity management; (x) archival parameters and motivations; (xi) free pool management; (xii) policy integrity reasons; (xiii) data multiplicity; (xiv) data synchronization; and/or (xv) any other purpose(s).

Cloning and/or replication for performance may include creating one or more duplicates of data units, and may include doing so in one or more strategic locations within a network and/or within a data recorder, for example, in order to address access congestion due to excessive requests for data stored in the data recorder 200/300 are being made. For example, the query task 1705 may identify when congestion in accessing information from a data recorder 200/300 is occurring, due to numerosity of access requests to particular stored data elements.

When the query task 1705 determines that policy does not imply data unit multiplication, the process 1700 ends. When the query task 1705 determines that one or more policy aspects imply data unit multiplication, control passes to a block 1710.

In the block 1710, multiplicity parameters are computed based on policy. Multiplicity parameters may include determining an appropriate number of cloned/replicated data units to address access congestion issues, determining appropriate locations of cloned/replicated data units in view of strategic considerations of network traffic, host activity or workload (e.g., where I/O requests are originating), and additionally may include consideration of one or more of the policy criteria listed above with respect to the query task 1705.

For example, the query task 1705 and/or the block 1710 may cause the process 1700 to ascertain frequency of accession to data elements. In other words, the process 1700 determines which data elements are most frequently accessed (as being indicative of causation for access times for all data to be increased). This could, for example, result in a list of different data groups that have been accessed more than a predetermined number of times during a predetermined time interval.

Routing and trafficking patterns associated with the data elements targeted via the acts associated with the block 1710 may be considered. As a result, one or more high-volume request sources can be identified, as well as data traffic paths associated with those high traffic volume sources and the data trafficking needs and short-term history of those paths. Control then passes to a query task 1715.

In the query task 1715, the multiplicity parameters computed in the block 1710 are examined to determine when policy integrity is consistent with implementation of the parameters. For example, creation of the number of cloned/replicated data units computed in the block 1710 may result in violation of the guaranteed minimum free pool discussed above with reference to FIG. 4. The locations computed for one or more of the cloned/replicated data units may also result in violation of policy in similar manner. When the query task 1715 determines that a policy violation would result from implementation of cloned copies in conformance with the parameters from the block 1710, control passes to a block 1720. When the query task 1715 determines that a policy violation would not result from implementation of cloned copies in conformance with the parameters from the block 1710, control passes to a block 1725.

In the block 1720, the controller 220 of FIG. 2 and/or the host is notified that a policy violation would result. The controller 220 or host may initiate alternative action(s) based upon action policies set via the process 1500 of FIG. 15. The process 1700 then ends.

When the block 1725 is invoked, data units are cloned or replicated in conformance with the parameters computed in the block 1710. For example, a replicated data unit may be copied to a data recorder adjacent a host that has been providing a number of requests for such information (as described above with reference to FIGS. 9 and 10). Control then passes to a block 1730.

In the block 1730, memory management data and any other descriptors are updated to reflect changes. For example, data descriptors that reflect the multiplicity or redundancy may be recorded.

In other words, the data recorder controller management information (e.g., such as is described above with reference to LBA table 208 of FIG. 2 and other descriptors for specifying the multiplicity information) is updated to include pointers associated with the one or more locations corresponding to the targeted and cloned data element or group of data elements. In one embodiment, the process 1700 then ends. In one embodiment, the process 1700 then iterates at the conclusion of the acts described with reference to blocks 1710 through 1730.

As a result, the process 1700 operates with the data recorder(s) 200/300 to promote policy conformance, for example by being able to route requests for heavily-accessed data elements to one of several different locations. This, in turn, may operate to alleviate congestion, thereby decreasing latency or traffic in accessing of data from the data recorder(s) 200/300.

The data recorder(s) 200/300 may also promote policy conformance by creation of suitable cloned/replicated data units to promote data redundancy. For example, this may be done to increase location diversity (as in conformance with the examples described above with reference to FIGS. 9 through 13) and/or to promote archival functionality and robustness and/or to improve performance and/or to improve performance.

FIG. 18 shows a flowchart describing a process 1800 for consolidating or "decloning" data (compacting data storage capacities and promoting efficiency) in an environment such as depicted in varying forms in FIGS. 7 through 13, supra, that finds utility in the context of the data recorder(s) 200/300. The process 1800 applies to data recorders including data recorders coupled to a single computer or client (e.g. 106), shared data recorders, and/or networked data recorders such as 112, 114, 128, 130 as shown in FIG. 1, for example.

The query task 1805 determines, based upon management policy and other relevant facts and circumstances, when data unit consolidation is implied. Examples of policy-based criteria and acts include any combination of one or more of purposes and operations such as: (i) performance reasons; (ii) data integrity and/or stability; (iii) data redundancy; (iv) data migration; (v) storage banking and/or data banking; (vi) extended archiving; (vii) data replication; (viii) data backup; (ix) capacity management; (x) archival parameters and motivations; (xi) free pool management; (xii) policy integrity reasons; (xiii) data multiplicity; (xiv) data synchronization; and/or (xv) any other purpose(s).

Among other things, the query task 1805 may determine when redundant and/or obsolete cloned examples of data units are indicated. Presence of obsolete examples of cloned data units may be determined based on records of cloned data exemplars, frequency of accession information vs. time and/or other policy-based considerations. For example, when the query task 1805 determines that redundant/obsolete records now in violation of policy are detected, control passes to a block 1810.

When the query task 1805 determines that policy does not imply data unit consolidation, the process 1800 ends (or optionally, goes back to the beginning of the process). When the query task 1805 determines that one or more policy aspects imply data unit consolidation, control passes to a block 1810.

In the block 1810, consolidation parameters are computed based on policy. For example, the block 1810 could result in a list of different data groups present in redundant form that are not being accessed more than a threshold number of times per predetermined time interval. Consolidation parameters may include determining an appropriate number of remaining copies to address storage capacity access congestion issues, determining appropriate locations of remaining copies in view of strategic considerations of network traffic, host activity or workload (e.g., in view of where I/O requests are originating), and additionally may include consideration of one or more of the policy criteria listed above with respect to the query task 1805. In one embodiment, the block 1810 could result in a list of different data groups present in redundant form that are not being accessed more than a threshold number of times per predetermined time interval.

For example, the query task 1805 may cause the process 1800 to ascertain reduced frequency of accession to data elements, e.g., to determine when cloned or replicated copies created via the process 1700 are no longer appropriate. In other words, the process 1800 determines which data elements are less frequently accessed. This could, for example, result in a list of different data groups that are no longer of being accessed more than a predetermined number of times during a predetermined time interval. Routing and trafficking patterns associated with the data elements targeted via the acts associated with the block 1810 et seq. may be identified. As a result, sources/hosts most likely to benefit from efficiency in routing of their requests for these data are identified, as well as data traffic paths associated with those hosts or other request sources and the data trafficking needs and short-term history of those paths. Control then passes to a query task 1815.

In the query task 1815, the consolidation parameters computed in the block 1810 are examined, for example to determine when policy integrity is consistent with implementation of the parameters. Put another way, reduction of the number of copies of data units may violate compliance with policies such as those relevant to the minimum multiplicity requirement associated with the data units that are redundant, for example, for diversity, other archival-related purposes, etc.

When the query task 1815 determines that a policy violation would result from implementation of consolidation in conformance with the parameters from the block 1810, control passes to a block 1820. In the block 1820, the controller 220/320 and/or the host is notified that a policy violation would result. The controller 220/320 or host may initiate alternative action based upon action policies set via the process 1500 of FIG. 15. The process 1800 then ends.

When the query task 1815 determines that a policy violation would not result from implementation of consolidation in conformance with the parameters from the block 1810, control passes to a block 1825.

When the block 1825 is invoked, data units are consolidated in conformance with the parameters computed in the block 1810. For example, one or more data units may be consolidated to a data recorder adjacent a host that has been providing a number of requests for such information and the location from which the data units were copied de-allocated and/or returned to the free pool (as described above with reference to FIGS. 8 and 10). In the block 1825, data units targeted via the acts described above, that is, one or more duplicative or otherwise obsolete data elements or groups of data elements, are marked for erasure and return to the free pool. Control then passes to a block 1830.

In the block 1830, data recorder controller management information (such as is described above with reference to LBA table 208 of FIG. 2, and other catalogue information associated with multiplicities) is updated to include revised information/pointers associated with the one or more locations corresponding to those targeted data elements or group of data elements which have been selected for erasure (block 1820). In one embodiment, an act of confirmation of erasure of the targeted data elements may be subsequent to the acts associated with the block 1820 and contemporaneously with the acts associated with the block 1825. In the block 1830, memory management data and any other descriptors are updated to reflect changes. For example, LBA data such as pointers may be recorded, such as updating memory management data to reflect that the resources that had been employed to store such targeted elements are being subsequently restored to the free pool.

In one embodiment, the process 1800 then ends. In one embodiment, the process 1800 then iterates at the conclusion of the acts described with reference to blocks 1810 through 1830.

The data recorder(s) 200/300 may promote policy conformance by consolidation/reduction of copies of data units to reduce data redundancy, for example when redundancy needs or policies change. For example, this may be to reduce location diversity (as in conformance with the examples described above with reference to FIGS. 9, through 13) and/or to promote archival efficiency. Policy conformance may include consolidating for performance via consolidating one or more duplicates of data units and doing so to result in fewer examples but in strategically-elected locations within a network and/or within a data recorder in order to address network traffic issues such as requests for data stored in the data recorder(s) 200/300.

The processes described above may be combined in arbitrary manners, yet in conformance with expectations and defined polices. For example, data migration is but one example where cloning/replicating (described above with reference to at least one or more of FIGS. 7 through 13 and 17) and consolidation (described above with reference to at least one or more of FIGS. 7 through 13 and 18) are combined. Archival management is another arena wherein selected archives may be recorded or maintained, and/or intermediary records or archives may be deleted.

The above examples proceed in accordance with environmental concerns (e.g., standalone vs. networked modalities) and in conformance with policies as set via, for example, the process 1500 described above with reference to FIG. 15. In some embodiments, when multiple data recorders are present in a networked environment, the data recorders are aware of one another, as well as the associated policy configurations.

The processes 1400 through 1800 described above with reference to FIGS. 14 through 18, and the sequence of data states of FIGS. 7 through 13, exemplify and/or facilitate deployment of data recorders 200/300, and augment capabilities achieved through usage of data recorders 200/300. A plurality of prior states may be readily and reliably archived, and an ensemble of such archived states are available for system restore operations in real time, as individual files or portions of files, or as entire "snapshots" of data relevant to a particular host or hosts, and at will, and may be accessed by more than one host contemporaneously and/or via different protocols or representations specific to the environment or operating system of that host.

Further, these may be accessed by more than one host contemporaneously and/or via different protocols or representations, which individual presentation and selections modalities and security procedures may be tailored to particularize criteria, such as providing contemporaneously availing suitable renditions to particularized parties in manners specific to the environment or operating system, and system privileges, of that host.

Redundancies and latencies associated with prior art spindle-based data storage techniques may be ameliorated. The processes 1400 through 1800 of FIGS. 14 through 18 may be implemented, in conjunction with a computation resource, such as is described below, for example, with reference to FIG. 19.

Computation Resource Example

Figure 19:
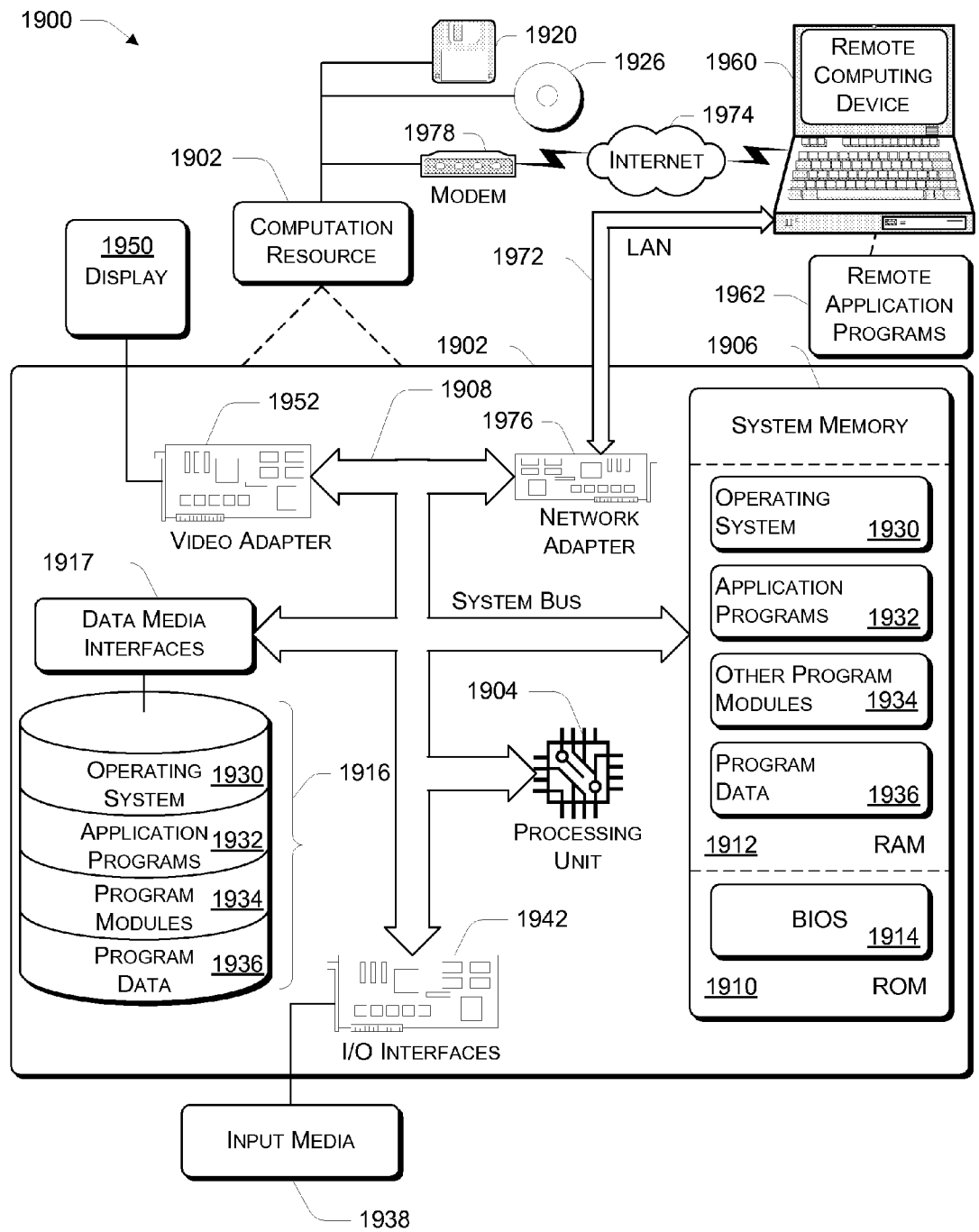
FIG. 19 illustrates an example of a general computation resource useful in the context of the environment of FIG. 1 and/or with the data recorder embodiments of FIG. 2 and/or FIG. 3.

FIG. 19 illustrates an example of a general computation resource 1900 useful in the context of the environment 100 of FIG. 1 and/or with the data recorder embodiments 200, 300 of FIG. 2 and/or FIG. 3, as well as in conformance with other aspects of the present disclosure. The computer 1900 is an example of an application in which different embodiments can be practiced. The present disclosure is provided in part in the general context of computer-executable instructions, such as program modules, executed by one or more computers or other devices. Generally, program modules include routines, programs, objects, components, data structures etc. that perform particular tasks or implement particular abstract data types. Typically, the functionality of the program modules may be combined or distributed as desired in various embodiments.

The concepts disclosed herein may be implemented in hardware or a combination of hardware, software, and/or firmware. For example, one or more application specific integrated circuits (ASICs) could be designed or programmed to embody the concepts disclosed herein.

FIG. 19 illustrates an example of a general computer environment 1900 that includes a computation resource 1902 capable of implementing the processes described herein. It will be appreciated that other devices may alternatively be used that include more components, or fewer components, than those illustrated in FIG. 19. The illustrated operating environment 1900 is only one example of a suitable operating environment, and the example described with reference to FIG. 19 is not intended to suggest any limitation as to the scope of use or functionality of the embodiments of this disclosure. Other well-known computing systems, environments, and/or configurations may be suitable for implementation and/or application of the subject matter disclosed herein.

The computation resource 1902 includes one or more processors or processing units 1904, a system memory 1906, and a bus 1908 that couples various system components including the system memory 1906 to processor(s) 1904 and other elements in the environment 1900. The bus 1908 represents one or more of any of several types of bus structures, including a memory bus or memory controller, a peripheral bus, an accelerated graphics port and a processor or local bus using any of a variety of bus architectures, and may be compatible with SCSI (small computer system interconnect), or other conventional bus architecture and protocol. The system memory 1906 includes nonvolatile read-only memory (ROM) 1910 and random access memory (RAM) 1912, which may or may not include volatile memory elements. A basic input/output system (BIOS) 1914, containing the elementary routines that help to transfer information between elements within computation resource 1902 and with external items, typically invoked into operating memory during start-up, is stored in ROM 1910.

The computation resource 1902 further may include a non-volatile read/write memory 1916, represented in FIG. 19 as a hard disk drive, coupled to bus 1908 via a data media interface 1917 (e.g., a SCSI, ATA, or other type of interface); a magnetic disk drive (not shown) for reading from, and/or writing to, a removable magnetic disk 1920 and an optical disk drive (not shown) for reading from, and/or writing to, a removable optical disk 1926 such as a compact disc or CD, DVD, or other optical media. It will be appreciated that functions served by some or all of the memory elements 1906, 1910, 1912, 1914, 1916 may be fulfilled via the data recorder 200 of FIG. 2 or the data recorder 300 of FIG. 3, for example, and may be configured as shown with reference to client 102(1) and data recorder 108 of FIG. 1, or in any other manner as determined appropriate, for example via the process 1500 of FIG. 15. Such may facilitate one or more functions, such as archival storage, providing capability for rapid restoration of data or application files to a prior state following corruption of such, and may enable extremely rapid booting on power reset/turn on.

In one embodiment, the non-volatile read/write memory 1916 includes the data recorder 200 of FIG. 2. Utilization of the data recorder 200/300 within the non-volatile read/write memory 1916 function facilitates providing read/write memory for operation of the computer 1900.

One of the performance enhancements that a data recorder 200 provides includes rapid and robust system boot capabilities, thus increasing productivity capabilities of the computer 1900 and also improving "power on reset" restoration of functionality. Such also includes capability for achieving a real-time backup capability for restoration of memory contents to that of any of the system states recorded, resulting in improvement of speed of system or data restoration capabilities, and also broadens the gamut of state representations available for perusal and selection, or "snapshots" of system data, that the computer 1900 is able to access. Additionally, archival data storage capabilities, in compact form factor, and also capable of increased robustness of archival functions, in comparison to traditional data archival methodologies and practices, may be provided, without incurring the complexities of operation, as well as the penalties associated with the separate hardware elements, medium etc. of conventional archival approaches.

The non-volatile read/write memory 1916 and associated computer-readable media provide nonvolatile storage of computer-readable instructions, data structures, program modules and other data for the computation resource 1902. Although the exemplary environment 1900 is described herein as employing a non-volatile read/write memory 1916, a removable magnetic disk 1920 and a removable optical disk 1926, it will be appreciated by those skilled in the art that other types of computer-readable media which can store data that is accessible by a computer, such as magnetic cassettes, FLASH memory cards, random access memories (RAMs), read only memories (ROM), and the like, may also be used in the exemplary operating environment.

A number of program modules may be stored via the non-volatile read/write memory 1916, magnetic disk 1920, optical disk 1926, ROM 1910, or RAM 1912, including an operating system 1930, one or more application programs 1932, other program modules 1934 and program data 1936. A user may enter commands and information into computation resource 1902 through input devices such as input media 1938 (e.g., keyboard/keypad, tactile input or pointing device, mouse, foot-operated switching apparatus, joystick, touchscreen or touchpad, microphone, antenna etc.). Such input devices 1938 are coupled to the processing unit 1904 through an input/output interface 1942 that is coupled to the system bus (e.g., a serial port interface, a parallel port interface, a universal serial bus (USB) interface, an IEEE 1354 (Firewire) interface, etc.). A monitor 1950 or other type of display device is also coupled to the system bus 1908 via an interface, such as a video adapter 1952.

The computation resource 1902 may include capability for operating in a networked environment (as illustrated in FIG. 1, for example) using logical connections to one or more remote computers, such as a remote computer 1960. The remote computer 1960 may be a personal computer, a server, a router, a network PC, a peer device or other common network node, and typically includes many or all of the elements described above relative to the computation resource 1902. In a networked environment, program modules depicted relative to the computation resource 1902, or portions thereof, may be stored in a remote memory storage device or data recorder 200/300. By way of example, remote application programs 1962 reside on a memory device of the remote computer 1960. The logical connections represented in FIG. 19 may include a storage area network (SAN, not illustrated in FIG. 19), local area network (LAN) 1972 and/or a wide area network (WAN) 1974, but may also include other networks.

Such networking environments are commonplace in modern computer systems, and in association with intranets and the Internet. In certain embodiments, the computation resource 1902 executes an Internet Web browser program (which may optionally be integrated into the operating system 1930), such as the "Internet Explorer" Web browser manufactured and distributed by the Microsoft Corporation of Redmond, Wash.

When used in a LAN-coupled environment, the computation resource 1902 communicates with or through the local area network 1972 via a network interface or adapter 1976. When used in a WAN-coupled environment, the computation resource 1902 typically includes interfaces, such as a modem 1978, or other apparatus, for establishing communications with or through the WAN 1974, such as the Internet. The modem 1978, which may be internal or external, is coupled to the system bus 1908 via a serial port interface.

In a networked environment, program modules depicted relative to the computation resource 1902, or portions thereof, may be stored in remote memory apparatus. It will be appreciated that the network connections shown are exemplary, and other means of establishing a communications link between various computer systems and elements may be used.

A user 102(N) (FIG. 1) of a computer may operate in a networked environment 100 using logical connections to one or more remote computers, such as a remote computer 1960, which may be a personal computer, a server, a router, a network PC, a peer device or other common network node. Typically, a remote computer 1960 includes many or all of the elements described above relative to the computer 1900 of FIG. 19, and may also be coupled to, or contain, one or more data recorders 200/300.

The computation resource 1902 typically includes at least some form of computer-readable media. Computer-readable media may be any available media that can be accessed by the computation resource 1902. By way of example, and not limitation, computer-readable media may comprise computer storage media and communication media.

Computer storage media includes volatile and nonvolatile, removable and non-removable media, implemented in any method or technology for storage of information, such as computer-readable instructions, data structures, program modules or other data. The term "computer storage media" includes, but is not limited to, data recorders, RAM, ROM, EEPROM, FLASH memory or other memory technology, CD, digital versatile disks (DVD) or other optical storage, magnetic cassettes, magnetic tape, magnetic disk storage or other magnetic storage devices, or any other media which can be used to store computer-intelligible information and which can be accessed by the computation resource 1902.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media includes wired media, such as wired network or direct-wired connections, and wireless media, such as acoustic, RF, infrared and other wireless media. The scope of the term computer-readable media includes combinations of any of the above.

CONCLUSION

A data recorder system is disclosed and described, with reference to application in a variety of computational engine contexts. Although specific embodiments have been illustrated and described herein, it will be appreciated by those of ordinary skill in the art that any arrangement which is calculated to achieve the same purpose may be substituted for the specific embodiments shown.

Traditional data storage and backup technologies impose physical boundaries which, in turn, result in both constraints in usage and complexities and limitations in storage configuration and management as well as provisioning of storage and user interfacing and access. The disclosed concepts facilitate masking of host configuration complexities and data recording complications associated with traditional data storage and backup approaches, at least in part via implementation of virtual boundaries to achieve user-transparent expansion capabilities. The disclosed subject matter also enables user-transparent archiving through the policy-driven technologies presented herein, realizing significant advantages in comparison to prior art systems that implement manually-configured backups from written policies and procedures that are host based.

Although the description above uses language that is specific to structural features and/or methodological acts, it is to be understood that the recitation of the appended claims is not limited to the specific features or acts described. Rather, the specific features and acts are disclosed as exemplary forms of implementing these concepts. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

Although this subject matter has been described in terms of certain embodiments, other embodiments apparent to those of ordinary skill in the art, including embodiments that do not provide all of the features and advantages set forth herein, are also within the scope of this disclosed concepts. Accordingly, the scope of the presently-described material is defined only by reference to the appended claims and equivalents thereof.

What is claimed is:

1. A data recorder comprising:
    a first memory element including read/write capability;
    a second memory element including non-volatile memory; and
    a controller for realizing memory management functions, wherein the controller writes selected data from the first memory element to the second memory element in response to a predetermined triggering event, the selected data including data that have been modified after a prior triggering event;
    wherein each triggering event results in one of multiple records each describing a state of data elements, and a user may select one of the multiple records and restore the selected record to operating memory in real time.

2. The data recorder of claim 1, wherein the prior triggering event is a most recent triggering event prior to the predetermined triggering event.

3. The data recorder of claim 1, wherein the first and second memory elements include random-access memory elements.

4. The data recorder of claim 1, wherein the first memory element includes spindle-based data storage elements, magnetic media, or hard disks.

5. The data recorder of claim 1, wherein the data recorder is configured to provide multiple networked computing resources with a common data storage and recall capability.

6. The data recorder of claim 1, further comprising driver software which can provide access to a plurality of archived states of the data recorder.

7. The data recorder of claim 1, wherein the data recorder is configured to share memory resources with a plurality of interconnected data recorders.

8. The data recorder of claim 1, wherein the data recorder is configured to emulate a tape drive, optical drive, or spindle-based hard disk drive.

9. The data recorder of claim 1, further comprising one or more external interfaces, which enable external computing resources to access the data recorder via a telecommunications network.

10. The data recorder of claim 1, wherein the first memory element or the second memory element is logically or virtually partitioned.

11. The data recorder of claim 1, wherein the data recorder acts as both a primary storage device and a backup storage device.

12. A process for recording a state of computer-readable information associated with a computing resource, comprising:
    accessing a read/write memory having temporal data stored therein;
    determining when a triggering event has occurred;
    flushing the read/write memory into a non-volatile memory when a triggering event has occurred;
    notifying one or more hosts connected to the non-volatile memory when the read/write memory is flushed, wherein the notification occurs via a default or a user-configured method; and
    writing changes to data sets into the non-volatile memory, the changes reflecting modification occurring after a prior triggering event.

13. The process of claim 12, wherein the notification includes an action to refresh a multiplicity presentation to the hosts based on one or more default or user-configured parameters.

14. The process of claim 13, wherein refreshing a multiplicity presentation comprises moving a pointer to the multiplicity presentation.

15. The process of claim 12, further comprising storing data descriptive of flushed memory contents in a non-volatile memory.

16. The process of claim 12, further comprising writing changes to data sets into the read/write memory, the changes reflecting modification occurring after a prior triggering event.

17. The process of claim 12, wherein the non-volatile memory includes flash memory.

18. A data recorder comprising:
    an input/output switch coupled to an interconnection through which the data recorder can communicate with one or more first computing resources;
    a port coupled to an external input/output interface through which the data recorder can communicate with one or more second computing resources;
    a plurality of memory elements in communication with the input/output switch and the port;
    a controller in communication with the input/output switch, the port, and the plurality of memory elements,
    wherein the controller is configured to coordinate data flow via the input/output switch to exchange information between the data recorder and the one or more first computing resources, and
    wherein the controller is configured to coordinate data flow through the external input/output interface via the port to exchange information between the data recorder and the one or more second computing resources.

* * * * *